(12) United States Patent
Sudo

(10) Patent No.: US 12,356,124 B2
(45) Date of Patent: Jul. 8, 2025

(54) IMAGE PROJECTION METHOD AND PROJECTOR

(71) Applicant: SEIKO EPSON CORPORATION, Tokyo (JP)

(72) Inventor: Chihiro Sudo, Minato-ku Shibaura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 466 days.

(21) Appl. No.: 17/954,071

(22) Filed: Sep. 27, 2022

(65) Prior Publication Data
US 2023/0098053 A1 Mar. 30, 2023

(30) Foreign Application Priority Data
Sep. 28, 2021 (JP) ................. 2021-157611

(51) Int. Cl.
*H04N 9/31* (2006.01)
*G03B 21/14* (2006.01)
*G06T 5/50* (2006.01)
*G06T 5/80* (2024.01)

(52) U.S. Cl.
CPC ............ *H04N 9/3185* (2013.01); *G06T 5/50* (2013.01); *G06T 5/80* (2024.01); *H04N 9/3147* (2013.01)

(58) Field of Classification Search
CPC .... H04N 9/3147; H04N 9/3185; G03B 21/14; G03B 21/147
See application file for complete search history.

(56) References Cited

U.S. PATENT DOCUMENTS

2012/0120372 A1  5/2012  Timoner et al.
2013/0083058 A1  4/2013  Yoshimura

FOREIGN PATENT DOCUMENTS

| JP | 2009-021771 A | 1/2009 |
| JP | 2010-224221 A | 10/2010 |
| JP | 2013-078001 A | 4/2013 |
| JP | 2014-503838 A | 2/2014 |
| JP | 2014-225182 A | 12/2014 |
| JP | 2017-032873 A | 2/2017 |
| JP | 2018-180105 A | 11/2018 |

*Primary Examiner* — Ryan D Howard
(74) *Attorney, Agent, or Firm* — Oliff PLC

(57) ABSTRACT

An image projection method includes, projecting a plurality of first markers onto a screen, projecting one or more first sub-markers each having an exterior appearance different from an exterior appearance of each of the plurality of first markers onto the screen, determining positions of the plurality of first markers, determining positions of the first sub-markers, determining a shape of a contour of a first image projected on the screen based on the positions of the plurality of first markers, determining a first line and a first edge of a blend area where the first image and a second image different from the first image are mixed with each other based on the positions of the plurality of first markers and the positions of the first sub-markers, and the first line and the first edge forming the contour of the first image, and projecting the first image onto the screen.

20 Claims, 18 Drawing Sheets

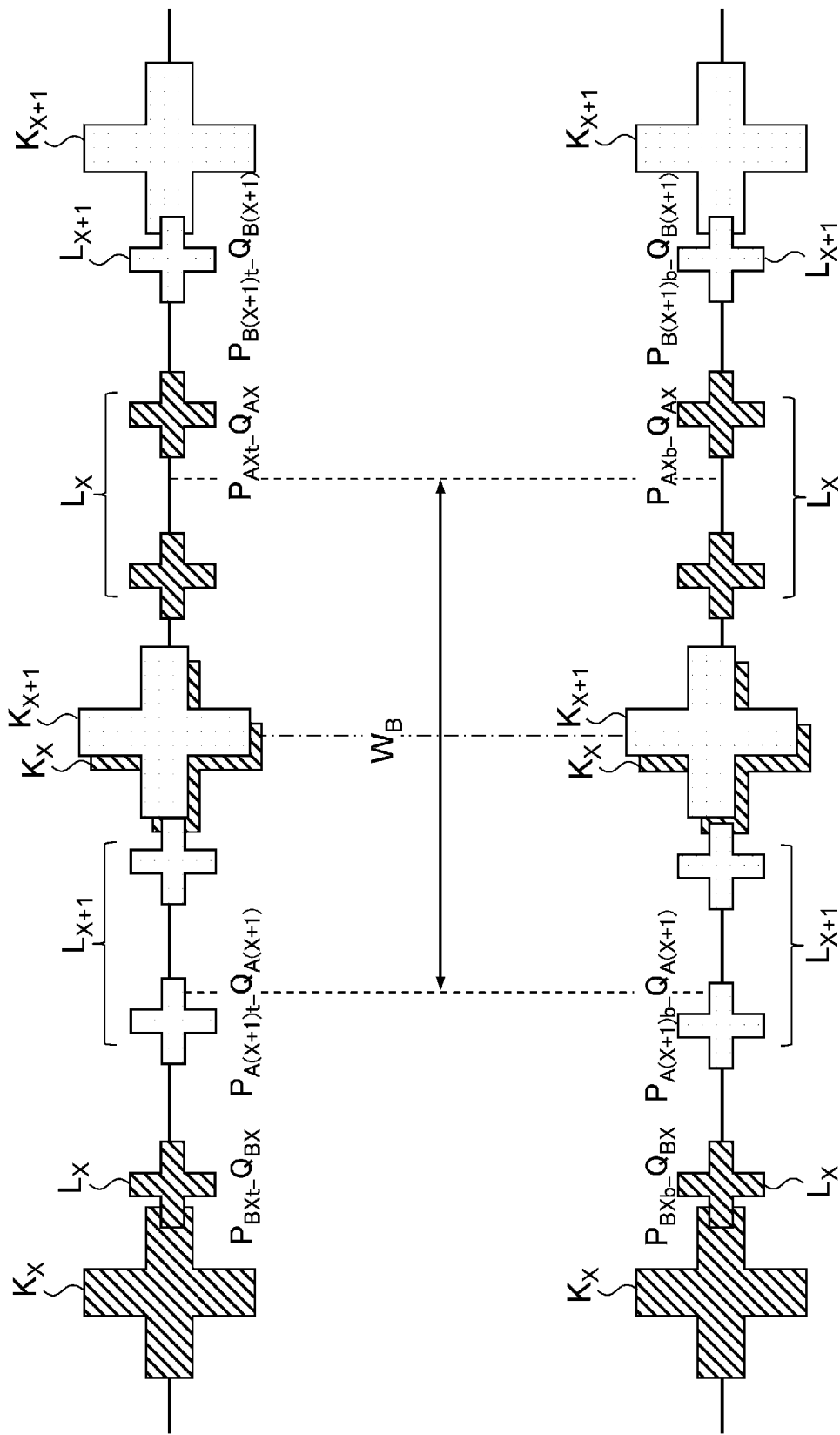

IMAGE PROJECTION METHOD AND PROJECTOR

The present application is based on, and claims priority from JP Application Serial Number 2021-157599 and JP Application Serial Number 2021-157611, both filed Sep. 28, 2021, the disclosure of which is hereby incorporated by reference herein in its entirety.

BACKGROUND

1. Technical Field

The present disclosure relates to an image projection method and a projector.

2. Related Art

JP-T-2014-503838 discloses a technology for determining a coordinate system common to two projectors by using a plurality of points selected by a user in an overlap area where images from the two projectors overlap each other on a screen.

In JP-T-2014-503838, the plurality of points, which each function as a marker, have an exterior appearance of one type over the images. If the markers are used for different purposes in a single image, it is likely to be difficult to distinguish the markers from each other in terms of purpose and therefore impair the convenience of the technology.

SUMMARY

An aspect relates to an image projection method including projecting a plurality of first markers onto a screen, projecting one or more first sub-markers each having an exterior appearance different from an exterior appearance of each of the plurality of first markers onto the screen, determining positions of the plurality of first markers on the screen, determining positions of the first sub-markers on the screen, determining an approximate shape of a contour of a first image projected on the screen by using the positions of the plurality of first markers, determining a first line that forms the contour of the first image, and a first edge that forms the contour of the first image and is an edge of a blend area where the first image and a second image different from the first image are mixed with each other by using the positions of the plurality of first markers and the positions of the first sub-markers, and projecting the first image onto the screen so as to contain the blend area.

Another aspect relates to a projector including a projection instrument that projects a plurality of first markers onto a screen, projects one or more first sub-markers each having an exterior appearance different from an exterior appearance of each of the plurality of first markers onto the screen, and projects a first image onto the screen in such a way that the first image contains a blend area where the first image and a second image different from the first image are mixed with each other, an input interface that detects input for determining positions of the plurality of first markers on the screen and input for determining positions of the first sub-markers on the screen, and a processing circuit that determines an approximate shape of a contour of the first image by using the positions of the plurality of first markers, and determines a first line that forms part of the contour of the first image, and a first edge that forms part of the contour of the first image and is an edge of the blend area by using the positions of the plurality of first markers and the first sub-markers.

Another aspect relates to an image projection method including projecting a plurality of first markers, and a first interpolation marker having an exterior appearance different from an exterior appearance of each of the plurality of first markers onto a screen, determining positions of the plurality of first markers and the first interpolation marker on the screen in such a way that the first interpolation marker is disposed in a position shifted from the plurality of first markers toward a second image projected on the screen in a first direction in which a first image projected on the screen and the second image different from the first image are sequentially arranged, determining a first line that passes through the plurality of first markers and the first interpolation marker and forms part of a contour of the first image, determining a first edge connected to points located on the first line between the first interpolation marker and the first marker closest to the first interpolation marker out of the plurality of first markers, the first edge forming part of the contour of the first image and being an edge of a blend area where the first image and the second image are mixed with each other, performing geometric correction on the first image by using the first line and the first edge, and projecting the first image onto the screen so as to contain the blend area.

Another aspect relates to a projector including a projection instrument that projects a plurality of first markers and a first interpolation marker having an exterior appearance different from an exterior appearance of each of the plurality of first markers onto a screen, and projects a first image onto the screen in such a way that the first image contains a blend area where the first image and a second image different from the first image are mixed with each other, an input interface that detects input for determining positions of the plurality of first markers and the first interpolation marker on the screen in such a way that the first interpolation marker is disposed in a position shifted from the plurality of first markers toward the second image in a first direction in which the first image and the second image are sequentially arranged, a processing circuit that determines a first line that passes through the plurality of first markers and the first interpolation marker and forms part of a contour of the first image, and determines a first edge connected to points located on the first line between the first interpolation marker and the first marker closest to the first interpolation marker out of the plurality of first markers, the first edge forming part of the contour of the first image and being an edge of the blend area, and a geometric correction circuit that performs geometric correction on the first image by using the first line and the first edge.

BRIEF DESCRIPTION OF THE DRAWINGS

FIG. 24 describes a method for determining sub-identifiers.

DESCRIPTION OF EXEMPLARY EMBODIMENTS

Figure 1:
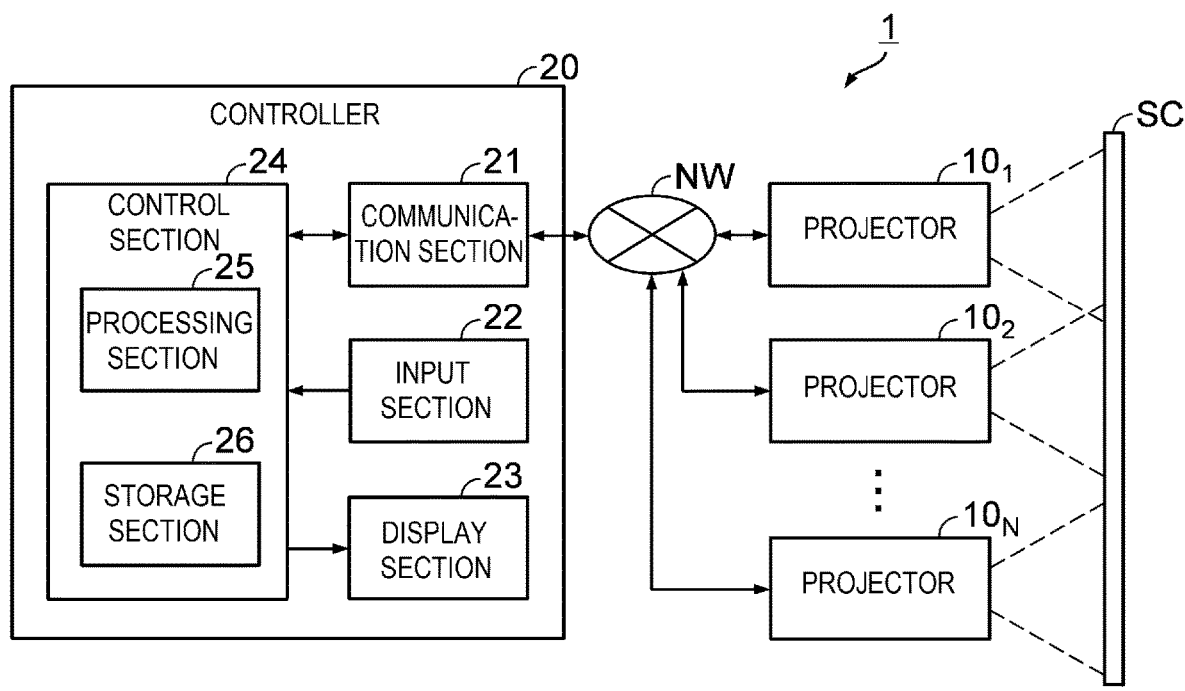
FIG. 1 is a diagrammatic block diagram for describing a projection system according to an embodiment.

An embodiment of the present disclosure will be described below with reference to the drawings. The embodiment illustrates a system for embodying the technical idea of the present disclosure and an apparatus and a method used in the system. The technical idea of the present disclosure does not restrict the type and configuration of each apparatus, a network topology, a series of processes, and other factors to those described below. In the drawings, the same or similar elements have the same or similar reference characters, and no duplicate description thereof will be made in some cases.

A projection system 1 according to the embodiment includes, for example, a plurality of projectors $10_1$, $10_2$, . . . , $10_N$ and a controller 20, which communicates with each of the projectors $10_1$ to $10_N$ via a network NW, as shown in FIG. 1. The projection system 1 is what is called a multi-projection system that projects a single whole image onto a screen SC, which is a projection target, by projecting partial images from the projectors $10_1$ to $10_N$.

The plurality of projectors $10_1$ to $10_N$ are formed of a first projector $10_1$, a second projector $10_2$, . . . , and an N-th projector $10_N$. In the present embodiment, N, which is the number of projectors, is an integer greater than or equal to 2. N may instead be 1. A projection surface of the screen SC, onto which the projectors $10_1$ to $10_N$ project images, may have a flat or curved surface. The projection surface of the screen SC may be a discontinuous surface.

The controller 20 includes, for example, a communication section 21, an input section 22, a display section 23, and a control section 24. The communication section 21 includes a communication circuit that establishes a communication link with each of the plurality of projectors $10_1$ to $10_N$ and processes signals transmitted via the communication link. The communication section 21 is communicably connected to each of the plurality of projectors $10_1$ to $10_N$ by establishing the communication link via the network NW with each of the plurality of projectors $10_1$ to $10_N$ under the control of the control section 24. The communication link may be a wired or wireless communication link or the combination of a wired communication link and a wireless communication link. That is, the communication section 21 may be directly connected to each of the plurality of projectors $10_1$ to $10_N$ or indirectly connected thereto via another relay apparatus. The communication section 21 may include, for example, an antenna via which a radio signal is transmitted and received, and a receptacle into which a plug of the communication cable is inserted.

The input section 22 is an input instrument that detects the user's input and outputs a signal according to the user's input to the control section 24. The input section 22 can, for example, be any of a variety of switches, such as push buttons and touch sensors, a pointing device, such as a mouse and a touch panel, and a variety of input instruments, such as a keyboard. A microphone may be employed as the input section 22 to detect the user's voice as the input by using voice recognition technology. The input section 22 may instead be a gesture sensor that detects the user's gestures as the input. The input section 22 may include a wired or wireless remote control.

The display section 23 is a display unit that displays images on the screen under the control of the control section 24. The display section 23 is, for example, a flat panel display. The control section 24 may transmit image data representing images to the projectors $10_1$ to $10_N$ via the communication section 21 to use the image projected by at least any of the projectors $10_1$ to $10_N$ as the image to be displayed on the display section 23. The input section 22 and the display section 23 may be a touch panel display that is an integrated input and display section.

The control section 24 includes a processing section 25 and a storage section 26. The processing section 25 forms a computer processing apparatus that processes operation necessary for the action of the controller 20. The processing section 25 achieves a variety of functions of the controller 20 that are described in the embodiment, for example, by executing a program stored in the storage section 26. A processing apparatus that forms at least part of the processing section 25 can, for example, be any of a variety of logical operation circuits, such as a central processing unit (CPU), a digital signal processor (DSP), a programmable logic device (PLD), and an application specific integrated circuit (ASIC). The processing section 25 may be formed of an integrated hardware component or a plurality of separate hardware components.

The storage section 26 is a computer readable storage apparatus that stores, for example, the program for a series of processes necessary for the action of the controller 20 and a variety of data. The storage section 26 can, for example, be a semiconductor memory or any of a variety of types of disk media. The storage section 26 is not limited to a nonvolatile auxiliary storage apparatus and may include a volatile primary storage apparatus, such as a register and a cash memory. At least part of the storage section 26 may be formed of part of the processing section 25. The storage section 26 may be formed of an integrated hardware component or a plurality of separate hardware components.

Figure 2:
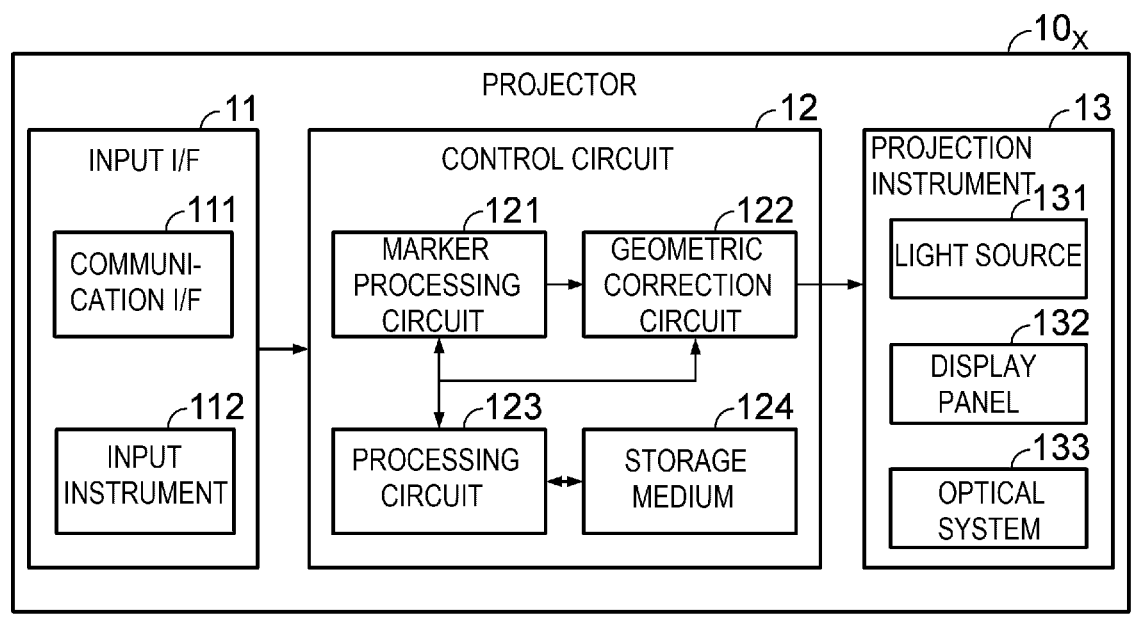
FIG. 2 is a block diagram for describing a projector in the projection system.

An X-th projector $10_X$ is any one of the plurality of projectors $10_1$ to $10_N$, as shown in FIG. 2. That is, X is an integer greater than or equal to 1 but smaller than or equal to N in the description. The configuration of each of the plurality of projectors $10_1$ to $10_N$ will be described below with reference to the X-th projector $10_X$ as a representative projector. The description of the other projectors is the same as the description of the X-th projector $10_X$ with ordinal number X replaced with an integer greater than or equal to 1 but smaller than or equal to N.

The X-th projector $10_X$ includes an input interface (I/F) 11, a control circuit 12, and a projection instrument 13. The input I/F 11 includes, for example, a communication I/F 111 and an input instrument 112. The input I/F 11 detects a variety of types of the user's input and outputs a signal according to the user's input to the control circuit 12.

The communication I/F 111 communicably connects to the controller 20 by establishing a communication link with the controller 20 via the network NW under the control of the control circuit 12. The communication I/F 111 includes a communication circuit that processes signals transmitted through the communication link. The communication link may be a wired or wireless communication link or the combination of a wired communication link and a wireless communication link. That is, the communication I/F 111 may be directly connected to the controller 20 or indirectly connected to the controller 20 via a separate relay apparatus. The communication I/F 111 may include, for example, an antenna via which a radio signal is transmitted and received, and a receptacle into which a plug of a communication cable is inserted.

The communication I/F 111, for example, sequentially acquires the image data transmitted from the controller 20 and outputs the image data to the control circuit 12. The communication I/F 111 may acquire image data to be reproduced at other reproduction apparatuses. The reproduction apparatuses can be any apparatus having the function of supplying the X-th projector $10_X$ with the image data, for example, a personal computer, a tablet terminal, a smartphone, a digital media player, a camera, a movie player, a wireless display adapter, a TV tuner, and a video game console.

The input instrument 112 detects the user's input and outputs a signal according to the user's input to the control circuit 12. At least any of the variety of input instruments employable as the input section 22 can be employed as the input instrument 112. The input instrument 112 may be a pointing device that detects a position on the screen SC. The input I/F 11 may detect the user's input inputted to the input section 22 of the controller 20 via the communication I/F 111.

The projection instrument 13 includes a light source 131, a display panel 132, and an optical system 133. The light source 131 includes a light emitter, for example, a discharge lamp and a solid-state light source. The display panel 132 is a light modulator having a plurality of pixels. The display panel 132 modulates the light outputted from the light source 131 in accordance with an image signal outputted from the control circuit 12. The display panel 132 is, for example, a transmissive or reflective liquid crystal light valve. The display panel 132 may instead be a digital micromirror device that controls reflection of the light on a pixel basis. The display panel 132 in one projection instrument 13 can, of course, include a plurality of display panels that modulate light having wavelengths different from each other. The optical system 133 projects an image onto the screen SC by irradiating the screen SC with the light modulated by the display panel 132. The optical system 133 may include a variety of lenses, mirrors, and drive mechanisms.

The control circuit 12 controls the projection instrument 13 to cause the projection instrument 13 to project a partial image based on the image data inputted via the communication I/F 111 onto the screen SC. The control circuits 12 of the projectors $10_1$ to $10_N$ control the projection instruments 13 to project a plurality of partial images that form a single whole image onto the screen SC based on the user's input detected by the input section 22 or the input instrument 112.

The control circuit 12 includes a marker processing circuit 121, a geometric correction circuit 122, a processing circuit 123, and a storage medium 124. The marker processing circuit 121 generates a plurality of markers to be projected onto the screen SC, for example, with the aid of an on-screen display (OSD) technology for geometric correction of the partial image projected on the screen SC. The marker processing circuit 121 projects the plurality of markers via the projection instrument 13. The positions of the plurality of markers on the screen SC are adjusted in accordance with the user's input inputted to the input section 22 or the input instrument 112. That is, the input I/F 11 detects the inputs that adjust the positions of the plurality of markers.

The geometric correction circuit 122 performs geometric correction on the partial image by controlling the display panel 132 based on the positions of the plurality of markers. Specifically, the processing circuit 123 calculates geometric correction parameters necessary for the geometric correction by determining the contour of the partial image based on basic information on the multi-projection inputted via the input I/F 11 and the positions of the plurality of markers. The geometric correction circuit 122 performs the geometric correction based on the geometric correction parameters. As a series of processes for the geometric correction performed by the geometric correction circuit 122 and the processing circuit 123, two-dimensional coordinate transformation, such as affine transformation and homographic transformation, interpolation, such as bilinear interpolation and bicubic interpolation, and other types of processing can be performed.

The processing circuit 123 forms a computer processing apparatus that processes operation necessary for the action of the X-th projector $10_X$. The processing circuit 123 achieves a variety of functions described in the embodiment, for example, by executing a control program stored in the storage medium 124. At least part of the marker processing circuit 121 and the geometric correction circuit 122 may be achieved by the processing circuit 123. A variety of logical operation circuits, for example, a CPU, a DSP, a PLD, and an ASIC, can be employed as a processing apparatus that forms at least part of the processing circuit 123. The processing circuit 123 may be formed of an integrated hardware component or a plurality of separate hardware components.

The storage medium 124 is a computer readable storage apparatus that stores the control program for a series of processes necessary for the action of the processing circuit 123 and a variety of data. The storage medium 124 can, for example, be a semiconductor memory or any of a variety of types of disk media. The storage medium 124 is not limited to a nonvolatile auxiliary storage apparatus and may include a volatile primary storage apparatus, such as a register and a cash memory. At least part of the storage medium 124 may be formed of part of the processing circuit 123. The storage medium 124 may be formed of an integrated hardware component or a plurality of separate hardware components.

Figure 3:
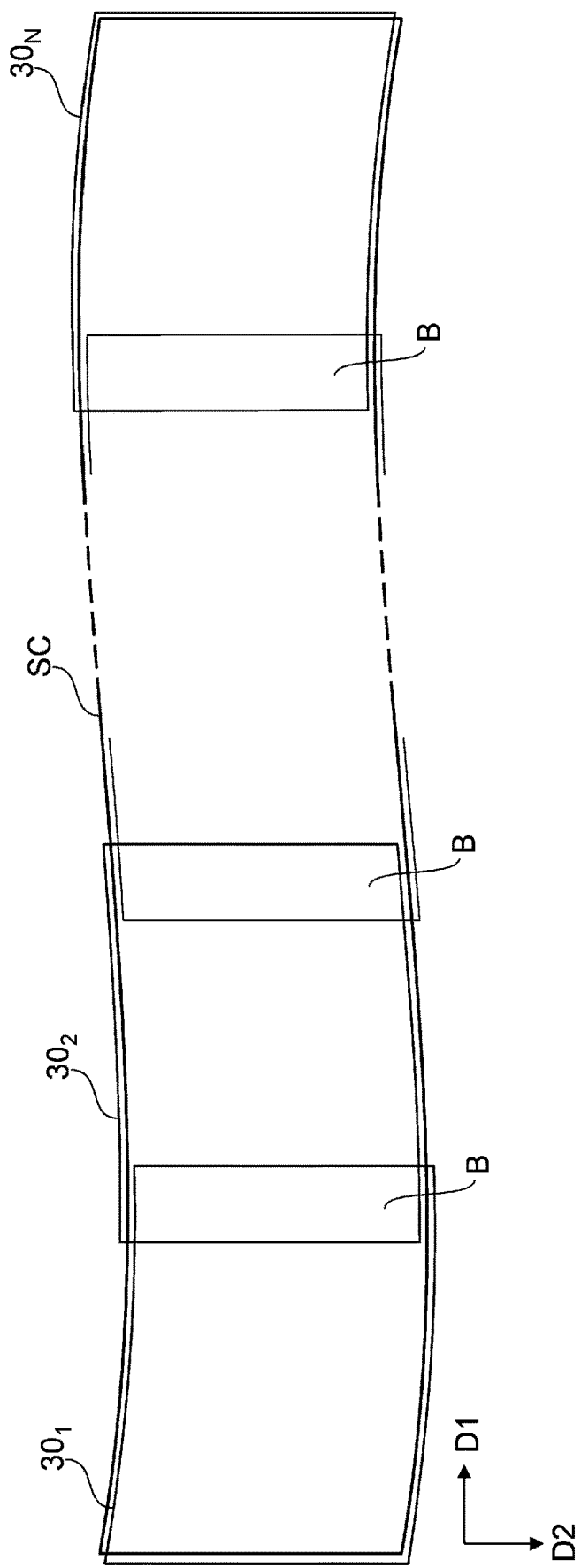
FIG. 3 describes a whole image formed of a plurality of partial images.

The projectors $10_1$ to $10_N$ project a first image $30_1$, a second image $30_2$, ..., and an N-th image $30_N$, which form the plurality of partial images, onto the screen SC in such a way that blend areas B, in each of which partial images adjacent to each other mix with each other, are included as shown, for example, in FIG. 3. The whole image is thus projected on the screen SC. For example, the first image $30_1$ is an image projected by the projection instrument 13 of the first projector $10_1$. The first image $30_1$ is projected onto the screen SC so as to contain the blend area B where the first image $30_1$ is mixed with the second image $30_2$ different from the first image $30_1$.

In the example shown in FIG. 3, the projection surface of the screen SC is a curved surface having curvature that is not fixed. The contour of the whole image, which is formed of the plurality of partial images, is controlled so as to coincide with the edges of the screen SC. That is, the present embodiment will be described with reference to a case where the projection surface coincides with the principal surface of the screen SC, and the projection surface may instead be defined as part of the principal surface of the screen SC. In the example shown in FIG. 3, the first image $30_1$ to the N-th image $30_N$ are sequentially arranged in a row along a first direction D1. The direction in which the plurality of partial images are arranged may be a second direction D2, which is perpendicular to the first direction D1, or the first direction D1 and the second direction D2.

To project the whole image as described above, the states in which the projectors $10_1$ to $10_N$ are installed are first so adjusted that the widest projection ranges of the projectors $10_1$ to $10_N$ can cover the range that forms the projection surface with no gaps. The widest projection range is the widest range over which the projectors can project images. The projectors $10_1$ to $10_N$ then project the plurality of markers, which define the contours of the partial images. The positions of the plurality of markers are adjusted to determine the contours of the partial images, and the geometric correction is performed on the first image $30_1$ to the N-th $30_N$ image based on the contours. The projection system 1 projects a geometrically corrected whole image as described above.

An example of a series of processes carried out by the projection system 1 will be specifically described below as an image projection method executed by the projection system 1 with reference to the flowchart in FIG. 4.

In step S101, upon detection of input that sets the basic information on the multi-projection, the input I/F 11 inputs the basic information to the processing circuit 123. The basic information, when inputted by the user via the input section 22 of the controller 20, can be transmitted to the input I/F 11 of each of the projectors $10_1$ to $10_N$. In this case, for example, the processing section 25 displays a dedicated input screen on the display section 23 to prompt the user to input the basic information. Instead, the basic information may be inputted by the user via the input instrument 112.

In the present embodiment, the basic information contains the number N of projectors $10_1$ to $10_N$, the resolution of each of the projectors $10_1$ to $10_N$, the amount of blending, and marker number information. The number N coincides with the number of partial images arranged in a row along the first direction D1. The resolution corresponds to the dimension, that is, the number of pixels of a partial image in the first direction D1. The highest resolution can correspond to the resolution of each of the display panel 132 of each of the projectors $10_1$ to $10_N$. The resolution is the resolution of the partial image to be projected and may therefore be changed by the processing circuit 123. The amount of blending is the amount, that is, the number of pixels that defines the dimension of the blend area B in the first direction D1. The marker number information is information on the number of markers arranged along the first direction D1.

In step S102, the projection instrument 13, for example, projects an image corresponding to the widest projection range of the partial image to prompt the user to adjust the state in which the corresponding one of the projectors $10_1$ to $10_N$ is installed. The states in which the projectors $10_1$ to $10_N$ are installed are thus so adjusted that overlap areas in each of which adjacent partial images overlap each other overlap with the entire blend areas B. The states in which the projectors $10_1$ to $10_N$ are installed may instead be adjusted, for example, by the user through movement of the enclosures of the projectors $10_1$ to $10_N$. The states in which the projectors $10_1$ to $10_N$ are installed may still instead be adjusted by a driving mechanism that is provided in the optical system 133 and shifts lenses and other components in accordance with the input detected by the input I/F 11.

Figure 5:
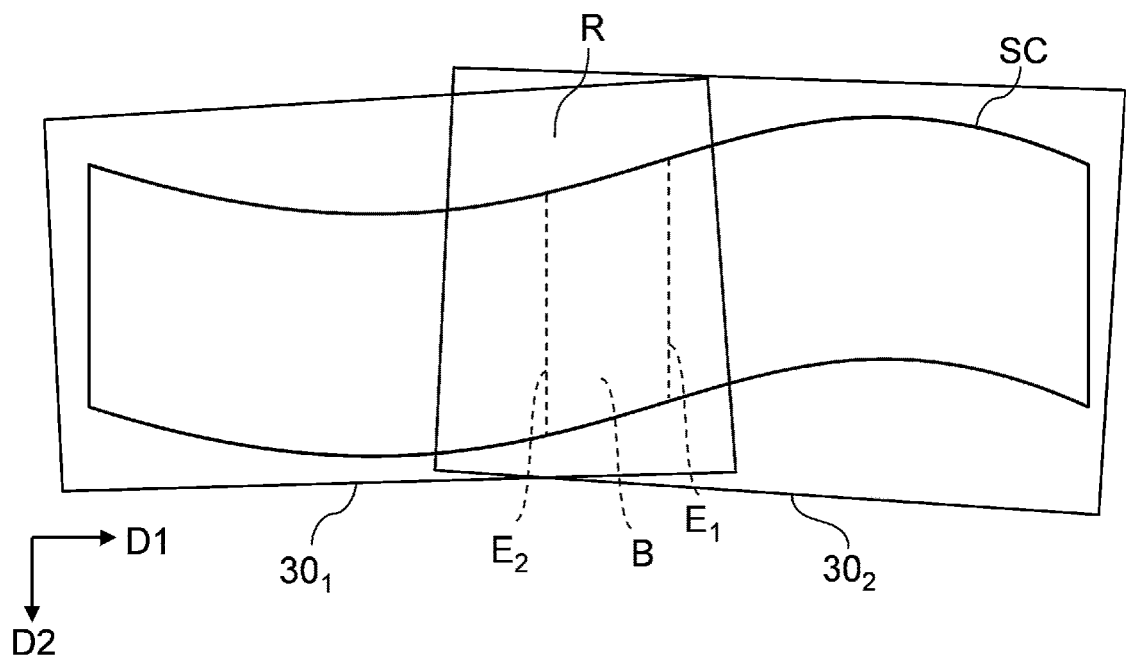
FIG. 5 describes the states in which the projectors are installed.

For example, when the first image $30_1$, and the second image $30_2$ form the whole image on the screen SC as shown in FIG. 5, the states in which the first projector $10_1$ and the second projector $10_2$ are installed are so adjusted that an overlap area R overlaps with the entire blend area B. The overlap area R is the area where the first image $30_1$ and the second image $30_2$ overlap with each other. The installation states may be roughly adjusted by the user's eyes based on the amount of blending or may be adjusted by using a target prepared in advance with respect to the screen SC. The states in which the projectors $10_1$ to $10_N$ are installed are thus adjusted.

Figure 6:
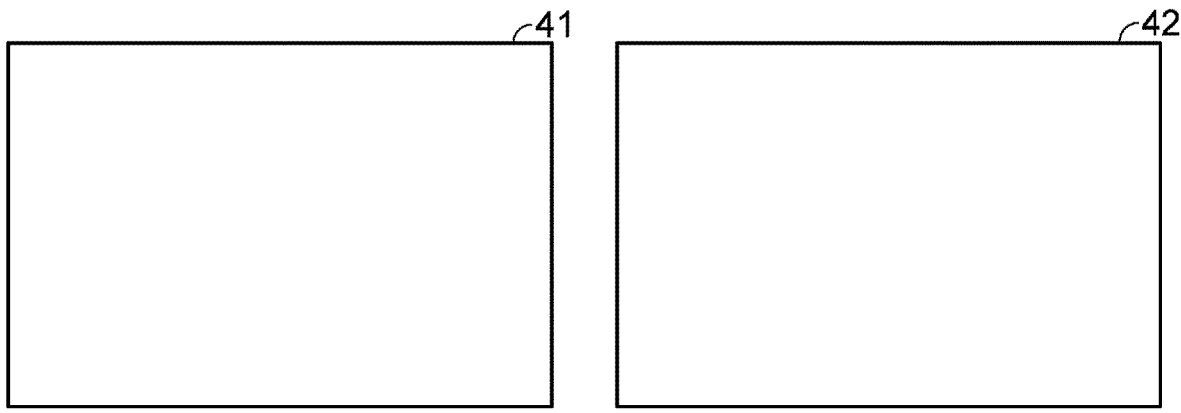
FIG. 6 describes panel images in the case shown in FIG. 5.

A first panel image 41 displayed on the display panel 132 of the first projector $10_1$ and a second panel image 42 displayed on the display panel 132 of the second projector $10_2$ each have a rectangular shape, as shown in FIG. 6. The first panel image 41 is an image displayed on the display panel 132 of the first projector $10_1$ when the first projector $10_1$ projects the first image $30_1$ in FIG. 5. The second panel image 42 is an image displayed on the display panel 132 of the second projector $10_2$ when the second projector $10_2$ projects the second image $30_2$ in FIG. 5. The first image $30_1$ and the second image $30_2$ in FIG. 5 have geometric distortion due, for example, to errors produced by the optical system 133 as compared with the first panel image 41 and the second panel image 42.

FIG. 5 shows only the first image $30_1$ and the second image $30_2$ as the plurality of partial images, and FIG. 6 shows only the first panel image 41 and the second panel image 42. In the examples shown in FIGS. 5 to 22, the case in which two projectors, the first projector $10_1$ and the second projector $10_2$, project the whole image as described above will be described as appropriate for simplicity of the description. It is, however, noted that the same holds true for the configuration, effects, and advantages of the projectors that project other pairs of adjacent partial images.

In step S103, the projection instrument 13 of each of the projectors $10_1$ to $10_N$ projects a plurality of main markers that define the contour of the partial image. The processing circuit 123 determines the plurality of main markers and a plurality of identifiers corresponding to the main markers based on the basic information inputted in step S101. The marker processing circuit 121 displays the plurality of main markers and identifiers determined by the processing circuit 123 on the display panel 132. The number of main markers is determined based on the marker number information inputted in step S101.

Figure 7:
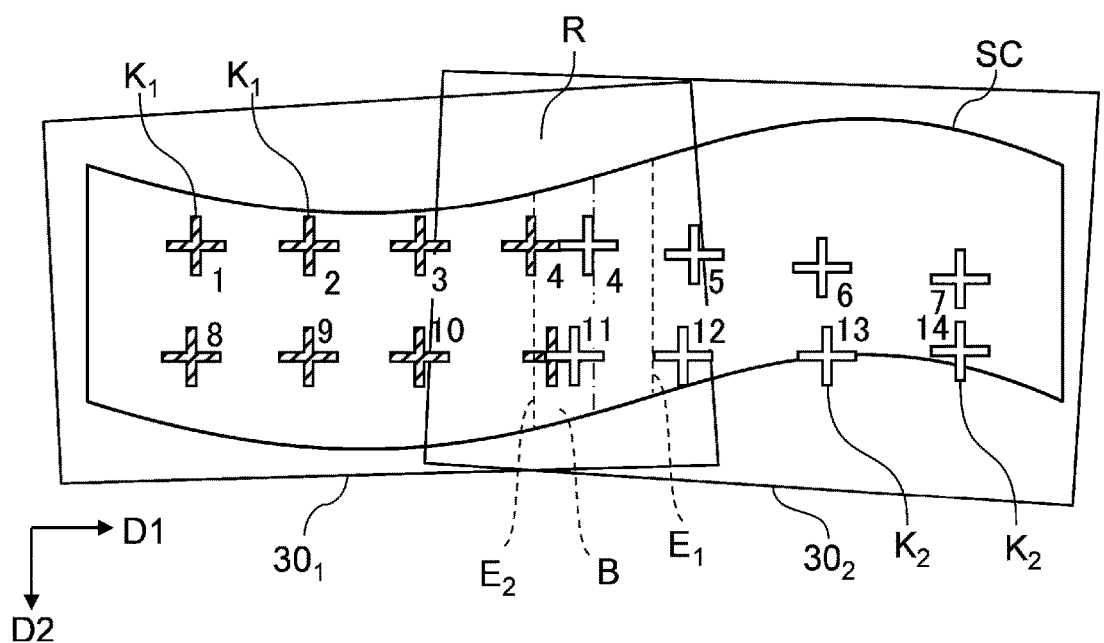
FIG. 7 describes the state in which main markers are projected.
Figure 8:
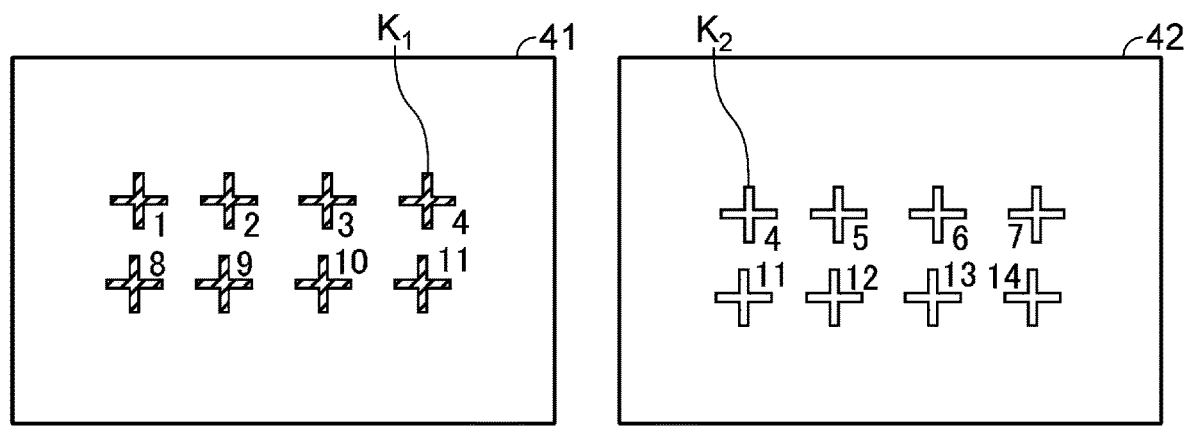
FIG. 8 describes the panel images in the case shown in FIG. 7.

For example, the first projector $10_1$ projects a plurality of first markers $K_1$, which are part of the plurality of main markers, onto the screen SC, as shown in FIGS. 7 and 8. The first projector $10_1$ projects a plurality of first identifiers corresponding to the plurality of first markers $K_1$ onto the screen SC along with the plurality of first markers $K_1$. Similarly, the second projector $10_2$ projects a plurality of second markers $K_2$, which are part of the plurality of main markers, onto the screen SC along with a plurality of second identifiers corresponding to the plurality of second markers $K_2$.

The first marker $K_1$ and the second marker $K_2$ have exterior appearances distinguishable from each other. In the examples in FIG. 7 and other figures, the first markers $K_1$ and the second markers $K_2$ have the same dimensions and shape, but have colors different from each other. Hatching patterns different from each other mean that the patterns have colors different from each other. With this configuration, the markers can be distinguished that they are the plurality of main markers projected from the different projectors, whereby the positions of the main markers are readily adjusted in step S104.

The plurality of first identifiers are 1 to 4 and 8 to 11. The plurality of second identifiers are 4 to 7 and 11 to 14. The plurality of first identifiers and the plurality of second identifiers have consecutive numbers assigned along the first direction D1 when the main markers are arranged on the screen SC. The step of arranging the main markers is thus simplified. The marker number information contains the number P of main markers arranged in a row at the edge of the screen SC along the first direction D1. That is, the number P is the number of main markers arranged at one side along the first direction D1 out of the contour of the whole image. In the examples shown in FIGS. 7 and 8, the number P is 7.

It is noted that each of the first marker $K_1$ having the first identifiers 4 and 11 and each of the second marker $K_2$ having the second identifiers 4 and 11 are overlap markers that overlap each other. For example, the first marker $K_1$ having the first identifier 4 and the second marker $K_2$ having the second identifier 4 can be considered a single main marker. The overlap markers serve to coordinate the positions of the first image $30_1$ and the second image $30_2$ with each other on the screen SC to mix the first image $30_1$ and the second image $30_2$ with each other in the blend area B. The overlap markers are formed of the first marker $K_1$ disposed in a position closest to the second image $30_2$ in the first direction D1 among the plurality of first markers $K_1$ and the second marker $K_2$ disposed in a position closest to the first image $30_1$ in the first direction D1 among the plurality of second markers $K_2$.

For example, the plurality of first identifiers are each so arranged that the distance to the corresponding first marker $K_1$ is shorter than the distances to the other first markers $K_1$. Similarly, the plurality of second identifiers are each so arranged that the distance to the corresponding second marker $K_2$ is shorter than the distances to the other second markers $K_2$. The first and second identifiers are thus projected so as to be readily recognized by the user.

In step S104, the input I/F 11 of each of the projectors $10_1$ to $10_N$ detects input for adjusting the positions of the plurality of main markers on the screen SC to determine the positions of the plurality of main markers. For example, the processing section 25 of the controller 20 prompts the user to adjust the positions of the main markers by displaying a message requesting that the main markers be placed at equal intervals on the display section 23. The user's input to the input section 22 is detected by the input I/F 11, so that the marker processing circuit 121 adjusts the positions of the plurality of main markers. After the adjustment, when the input I/F 11 detects input for determining the positions of the plurality of main markers, the processing circuit 123 determines that the positions of the plurality of main markers have been determined and proceed to the process in step S105.

Figure 9:
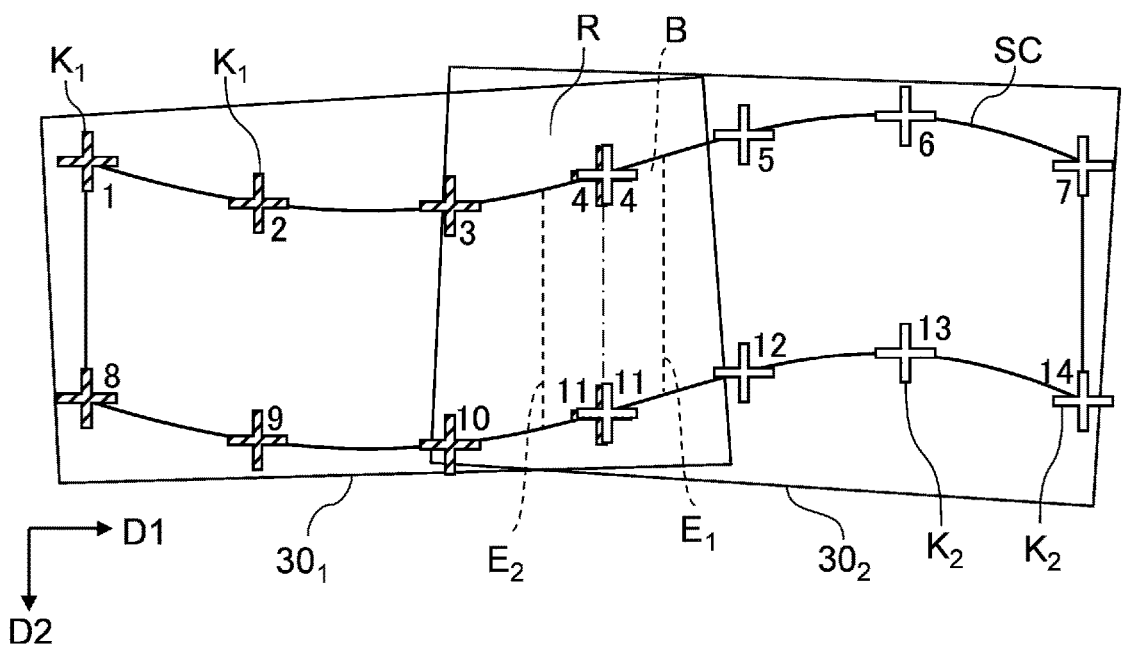
FIG. 9 describes the state in which the positions of the main markers have been adjusted.
Figure 10:
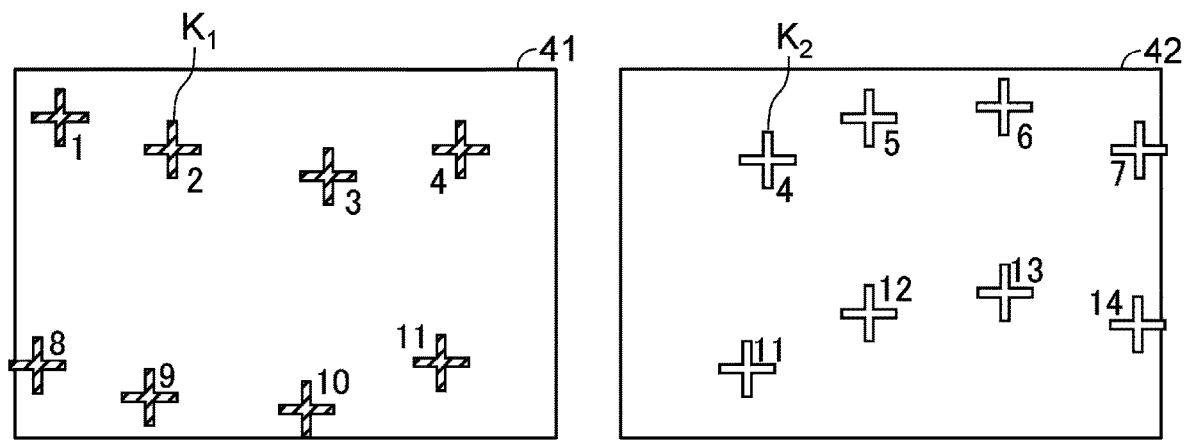
FIG. 10 describes the panel images in the case shown in FIG. 9.

The positions of the plurality of first markers $K_1$ and the plurality of second markers $K_2$ are so determined that one or more of the plurality of first markers $K_1$ and one or more of the plurality of second markers $K_2$ overlap with each other as the overlap marker, as shown in FIGS. 9 and 10. All the plurality of first markers $K_1$, except for the overlap marker, are disposed in positions shifted from the plurality of second markers $K_2$ in the first direction D1 toward the first image $30_1$. All the plurality of second markers $K_2$, except for the overlap marker, are disposed in positions shifted from the plurality of first markers $K_1$ in the first direction D1 toward the second image $30_2$.

Specifically, the first markers $K_1$ having the first identifiers 1 to 3, the overlap marker having the identifier 4, and the second marker $K_2$ having the second identifiers 5 to 7 are arranged at equal intervals along the first direction D1 at the upper edge of the screen SC in FIG. 9. The upper edge means the edge located on the side facing away from the second direction D2. The first markers $K_1$ having the first identifiers 8 to 10, the overlap marker having the identifier 11, and the second marker $K_2$ having the second identifiers 12 to 14 are arranged at equal intervals along the first direction D1 at the lower edge of the screen SC in FIG. 9. The lower edge means the edge located on the side facing the second direction D2. The overlap markers are placed, for example, on the center line of the blend area B along the second direction D2 and on the boundaries of the blend area B. It is noted that the equal intervals only needs to be roughly determined by the user's eyes and are not required to be strictly equal intervals.

The positions of the plurality of first markers $K_1$ and the plurality of second markers $K_2$ on the screen SC are thus determined via the input I/F 11. The positions of the plurality of first markers $K_1$ and the plurality of second markers $K_2$ are used to determine approximate shapes of the contours of the first image $30_1$ and the second image $30_2$ and further determine an approximate shape of the contour of the whole image.

In step S105, the projection instrument 13 of each of the projectors $10_1$ to $10_N$ projects a plurality of sub-markers that define two edges of the blend area B, the right and left edges in FIG. 9. The right side means the side facing in the first direction. The left side means the side facing away from the first direction. The processing circuit 123 determines the plurality of sub-markers and a plurality of identifiers corresponding to the sub-markers based on the basic information inputted in step S101. The marker processing circuit 121 displays the plurality of sub-markers and identifiers determined by the processing circuit 123 on the display panel 132. The number of sub-markers is determined based on the marker number information inputted in step S101.

The plurality of sub-markers each have an exterior appearance different from that of each of the main markers. For example, when the plurality of main markers have the same dimensions, the plurality of sub-markers have dimensions smaller than those of the plurality of main markers.

The difference in the exterior appearance between the main markers and the sub-markers is not limited to the dimensions thereof, and may be the difference in shape, color, or any other factor thereof.

Figure 11:
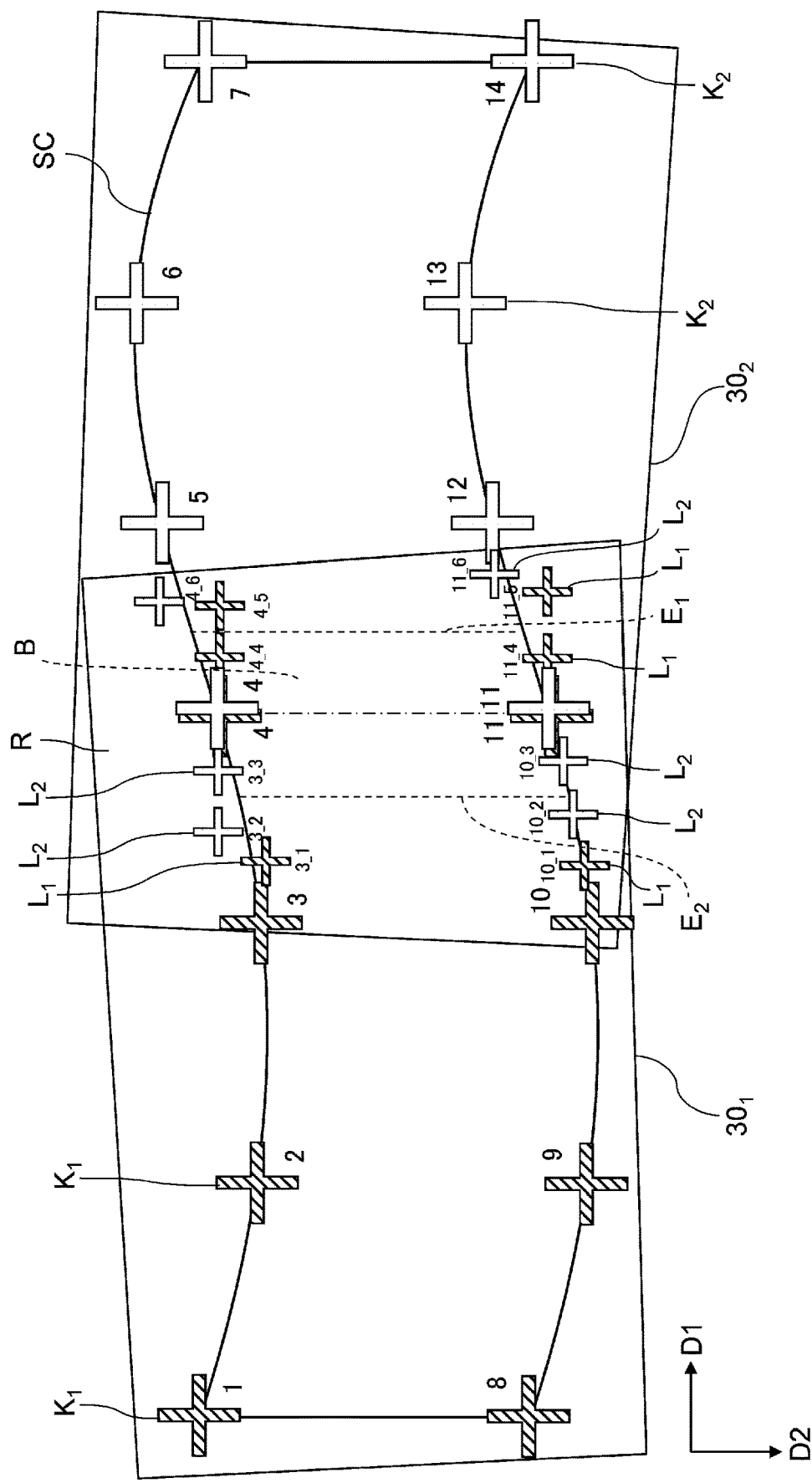
FIG. 11 describes the state in which sub-markers are projected.
Figure 12:
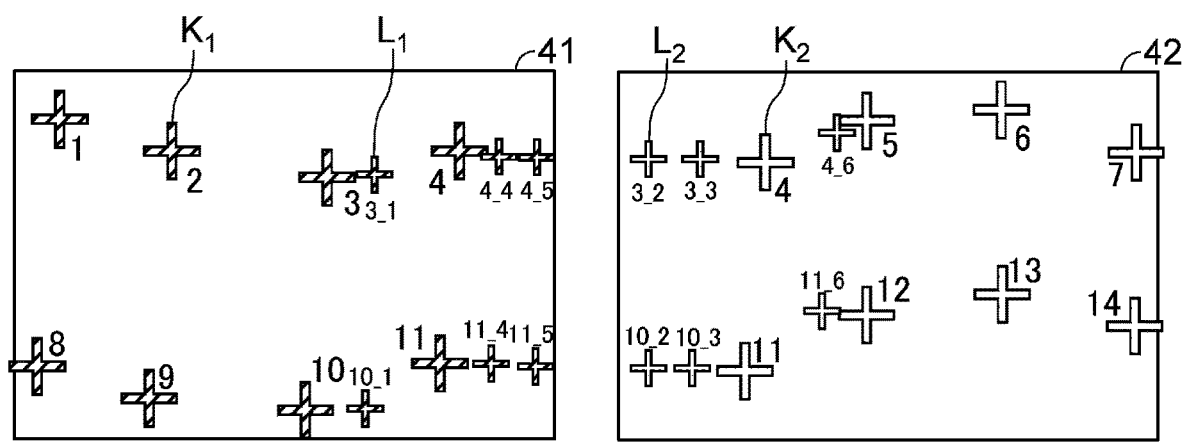
FIG. 12 describes the panel images in the case shown in FIG. 11.

The first projector $10_1$ projects a plurality of first sub-markers $L_1$, which are part of the plurality of sub-markers, onto the screen SC, as shown in FIGS. 11 and 12. The first projector $10_1$ projects a plurality of first sub-identifiers corresponding to the plurality of first sub-markers $L_1$ onto the screen SC along with the plurality of sub-markers $L_1$. Similarly, the second projector $10_2$ projects a plurality of second sub-markers $L_2$, which are part of the plurality of sub-markers, onto the screen SC along with a plurality of second sub-identifiers corresponding to the plurality of second sub-markers $L_2$.

The first sub-marker $L_1$ and the second sub-marker $L_2$ have exterior appearances distinguishable from each other. In the examples in FIG. 11 and other figures, the first sub-marker $L_1$ and the second sub-marker $L_2$ have the same dimensions and shape, but have colors different from each other. The first markers $K_1$ and the first sub-markers $L_1$ have the same color. Similarly, the second markers $K_2$ and the second sub-markers $L_2$ have the same color.

The plurality of first sub-identifiers are 3_1, 4_4, 4_5, 10_1, 11_4, and 11_5. The plurality of second sub-identifiers are 3_2, 3_3, 4_6, 10_2, 10_3, and 11_6. The plurality of first sub-identifiers and the plurality of second sub-identifiers have consecutive numbers assigned along the first direction D1 when the sub-markers are arranged on the screen. The step of arranging the sub-markers is thus simplified.

The marker number information contains the number Q of sub-markers arranged in a row between main markers adjacent to each other at the edge of the screen SC along the first direction D1. That is, the number Q is the number of sub-markers arranged between main markers adjacent to each other at one side along the first direction D1 out of the contour of the whole image. The number Q is equal to the number of first sub-markers $L_1$ arranged in a row and also equal to the number of second sub-markers $L_2$ arranged in a row. In the examples shown in FIGS. 11 and 12, the number Q is 3.

For example, the sub-identifiers that identify the sub-markers, such as the first and second sub-identifiers, are expressed in a form "(primary number)_(secondary number)". The primary number of the sub-identifier of each sub-marker is equal to the number of the smaller one of the identifiers of the pair of main markers that sandwich the sub-marker. The secondary numbers of the sub-identifiers of the sub-markers have consecutive numbers assigned along the first direction D1 when the sub-markers are arranged between the pair of main markers.

The plurality of first sub-identifiers are each so arranged that the distance to the corresponding first sub-marker $L_1$ is shorter than the distances to the other first sub-markers $L_1$. Similarly, the plurality of second sub-identifiers are each so arranged that the distance to the corresponding second sub-marker $L_2$ is shorter than the distances to the other second sub-markers $L_2$. The first and second sub-identifiers are thus projected so as to be readily recognized by the user.

In step S106, the input I/F 11 of each of the projectors $10_1$ to $10_N$ detects input for adjusting the positions of the plurality of sub-markers on the screen SC to determine the positions of the sub-markers. For example, the processing section 25 of the controller 20 prompts the user to adjust the positions of the sub-markers by displaying a message requesting that the sub-markers be placed at equal intervals on the display section 23. The user's input to the input section 22 is detected by the input I/F 11, so that the marker processing circuit 121 adjusts the positions of the plurality of sub-markers.

Figure 13:
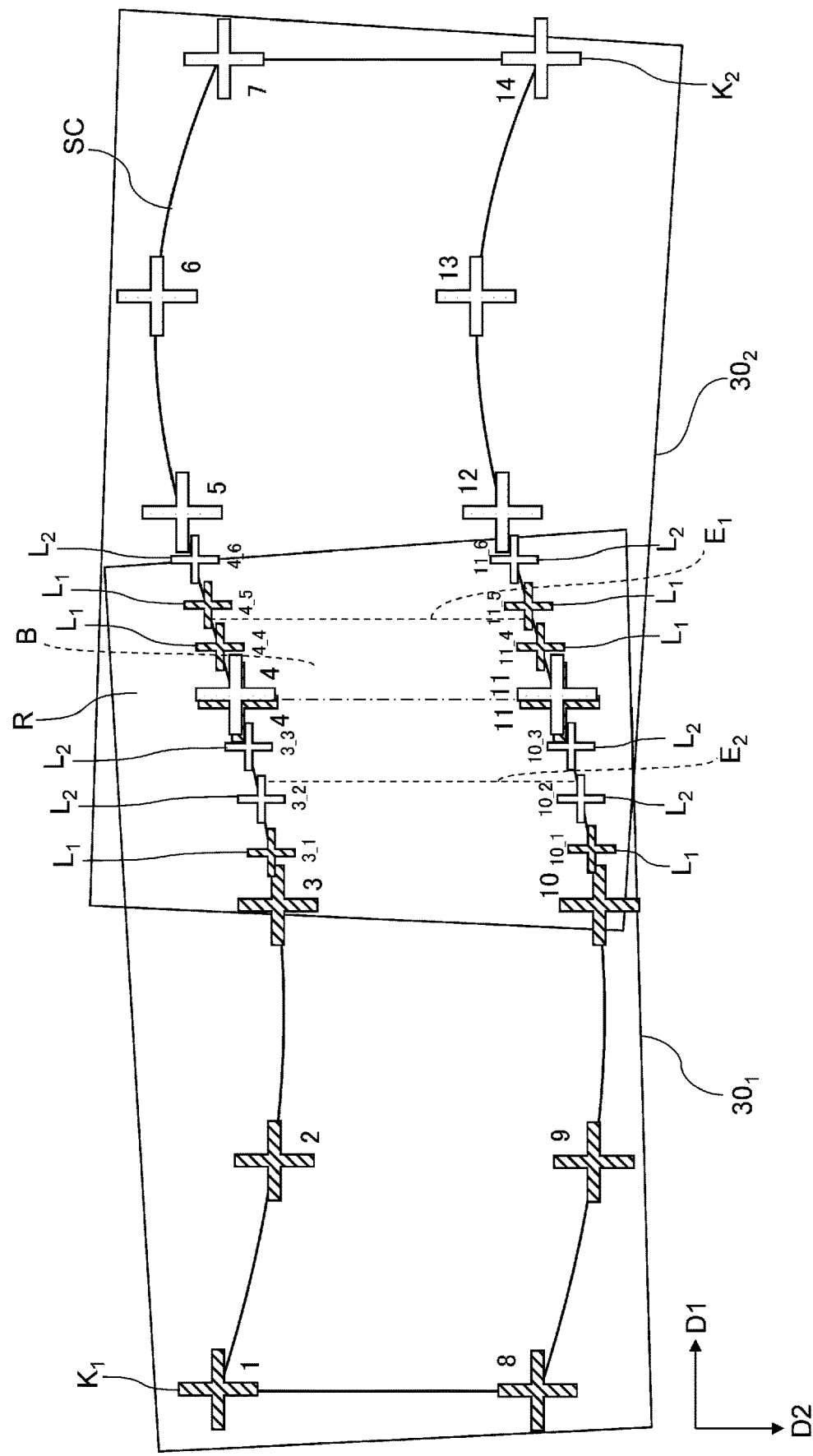
FIG. 13 describes the state in which the positions of the sub-markers have been adjusted.

The first sub-marker $L_1$ having the first sub-identifier 3_1 and the two second sub-markers $L_2$ having the second sub-identifiers 3_2 and 3_3 are arranged at equal intervals at the upper edge of the screen SC between the first marker $K_1$ having the first identifier 3 and the overlap marker, as shown in FIG. 13. The first sub-marker $L_1$ having the first sub-identifier 10_1 and the two second sub-markers $L_2$ having the second sub-identifiers 10_2 and 10_3 are arranged at equal intervals at the lower edge of the screen SC between the first marker $K_1$ having the first identifier 10 and the overlap marker. In this case, in the example shown in FIG. 13, the second sub-markers $L_2$ having the second sub-identifiers 3_2 and 10_2 are adjacent to a second edge $E_2$.

The two first sub-markers $L_1$ having the first sub-identifiers 4_4 and 4_5 and the second sub-marker $L_2$ having the second sub-identifier 4_6 are arranged at equal intervals at the upper edge of the screen SC between the overlap marker and the second marker $K_2$ having the second identifier 5. The two first sub-markers $L_1$ having the first sub-identifiers 11_4 and 11_5 and the second sub-marker $L_2$ having the second sub-identifier 11_6 are arranged at equal intervals at the lower edge of the screen SC between the overlap marker and the second marker $K_2$ having the second identifier 12. In this case, in the example shown in FIG. 13, the pair of first sub-markers $L_1$ having the first sub-identifiers 4_5 and 11_5 are adjacent to a first edge $E_1$.

The amount of blending in the blend area B is defined as the distance between the first edge $E_1$ and the second edge $E_2$ of the blend area B. The first edge $E_1$ forms part of the contour of the first image $30_1$ having undergone the geometric correction. Out of the plurality of first sub-markers $L_1$ sandwiched between a pair of main markers, the first sub-marker $L_1$ disposed in a position shifted in the first direction D1 from the blend area B toward the center of the second image $30_2$ but closest to the blend area B functions as a first interpolation marker. In the example shown in FIG. 13, the two first sub-markers $L_1$ having the first sub-identifiers 4_5 and 11_5 each correspond to the first interpolation marker.

The positions of the plurality of first markers $K_1$ and the first interpolation markers are so determined that the first interpolation markers are disposed in positions shifted in the first direction D1 from the plurality of first markers $K_1$ toward the second image $30_2$. The initial positions of the first interpolation markers in step S105 can therefore be in an area facing the second image $30_2$ within the widest range over which the first image $30_1$ can be projected. Assuming that the first sub-identifier of each of the first interpolation markers is called a first interpolation identifier, the first interpolation identifier has information corresponding to the first identifier of the first marker $K_1$ closest to the first interpolation marker. That is, the first interpolation identifiers are 4_5 and 11_5 in the example shown in FIG. 13. That is, the primary numbers of the first interpolation identifiers are 4 and 11, which are equal to 4 and 11 that are the first identifiers of the first markers $K_1$ closest to the first interpolation markers.

When a plurality of sub-markers are arranged at equal intervals between a pair of main markers, the sub-markers placed in positions shifted from the first interpolation markers toward the second image $30_2$ are placed in some cases outside the widest projection range of the first projector $10_1$. In this case, the sub-markers placed in positions shifted from the first interpolation markers toward the second image $30_2$ are projected as second index markers from the second projector $10_2$. The plurality of sub-markers can thus be arranged at equal intervals between the pair of main markers.

The second edge $E_2$ forms part of the contour of the second image $30_2$ having undergone the geometric correction. Out of the plurality of second sub-markers $L_2$ sandwiched between a pair of main markers, the second sub-marker $L_2$ disposed in a position shifted in the first direction D1 from the blend area B toward the center of the first image $30_1$ but closest to the blend area B functions as a second interpolation marker. In the example shown in FIG. 13, the two second sub-markers $L_2$ having the second sub-identifiers 3_2 and 10_2 each correspond to the second interpolation marker.

The positions of the plurality of second markers $K_2$ and the second interpolation markers are so determined that the second interpolation markers are disposed in positions shifted in the first direction D1 from the plurality of second markers $K_2$ toward the first image $30_1$. The initial positions of the second interpolation markers in step S105 can therefore be in an area facing the first image $30_1$, within the widest range over which the second image $30_2$ can be projected. Assuming that the second sub-identifier of each of the second interpolation markers is called a second interpolation identifier, the second interpolation identifier has information corresponding to the second identifier of the second marker $K_2$ closest to the second interpolation marker. That is, the second interpolation identifiers are 3_2 and 10_2 in the example shown in FIG. 13. That is, the primary numbers of the second interpolation identifiers are 3 and 10, which are equal to the values as a result of subtraction of 1 from 4 and 11 that are the second identifiers of the second markers $K_2$ closest to the second interpolation markers.

When a plurality of sub-markers are arranged at equal intervals between a pair of main markers, the sub-markers placed in positions shifted from the second interpolation markers toward the first image $30_1$ are placed in some cases outside the widest projection range of the second projector $10_2$. In this case, the sub-markers placed in positions shifted from the second interpolation markers toward the first image $30_1$ are projected as first index markers from the first projector $10_1$. The plurality of sub-markers can thus be arranged at equal intervals between the pair of main markers.

In step S107, the processing circuit 123 of each of the projectors $10_1$ to $10_N$ evaluates whether or not the positions of the plurality of sub-markers have been determined. For example, when the first or second interpolation markers are not achieved by a plurality of sub-markers arranged at equal intervals due to the relationship between the overlap area R and the number of sub-markers Q, the processing circuit 123 determines that the positions of the plurality of sub-markers are not determined.

For example, the processing section 25 of the controller 20 requests the user to input a reply by displaying a message asking whether or not the sub-marker have been placed at equal intervals on the display section 23. The user's input to the input section 22 is detected by the input I/F 11, so that the processing circuit 123 evaluates whether or not the positions of the plurality of sub-markers have been determined. When the processing circuit 123 determines in step S107 that the positions of the plurality of sub-markers have been determined, the processing circuit 123 proceeds to the process in step S109, whereas when the processing circuit 123 determines that the positions of the plurality of sub-markers are not determined, the processing circuit 123 proceeds to the process in step S108.

Figure 14:
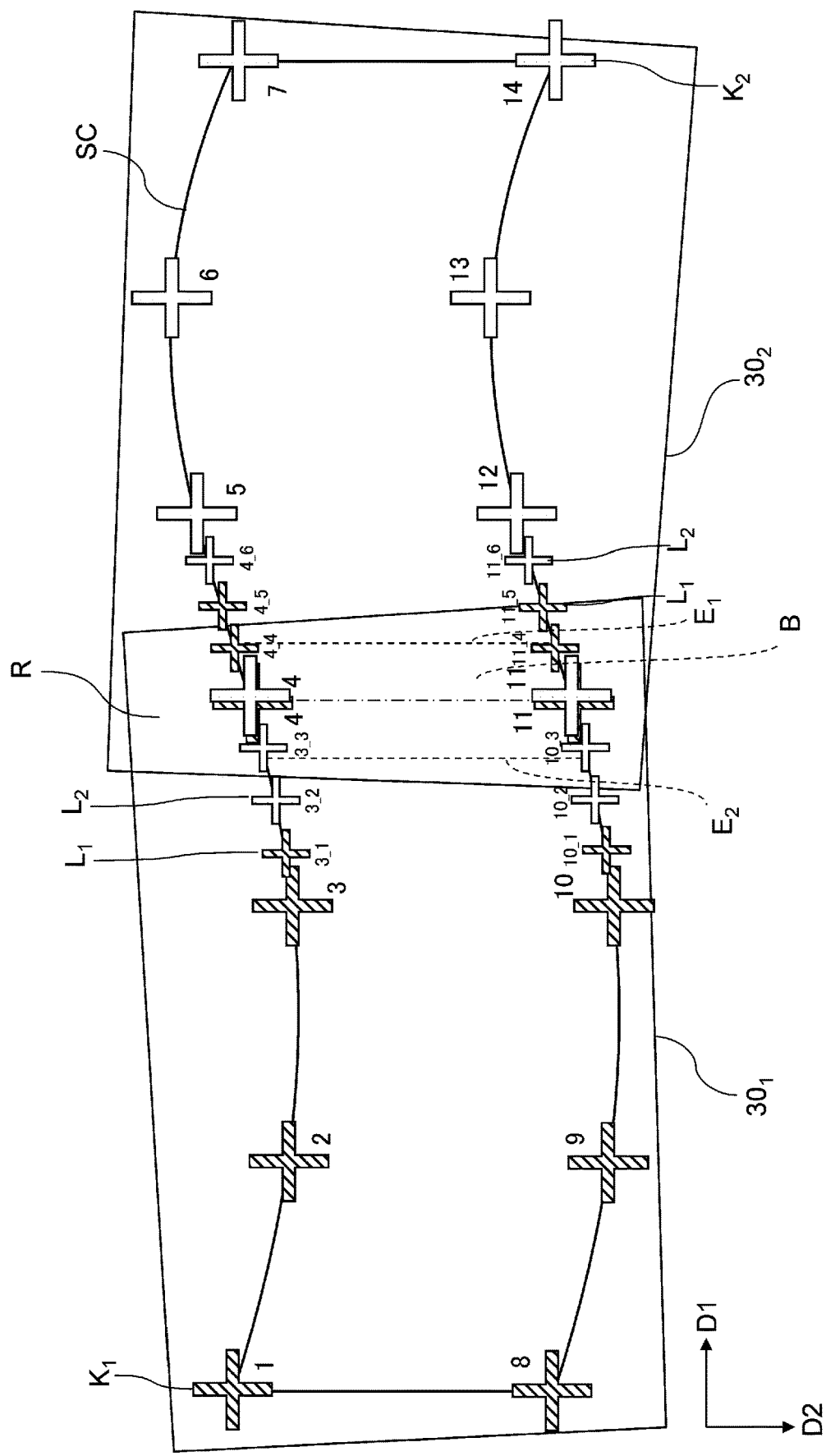
FIG. 14 describes the positions of the sub-markers in a case where interpolation markers cannot be achieved.

When the overlap area R is not large enough for the number of sub-markers Q and the blend area B as shown in FIG. 14, for example, the first sub-marker having the first sub-identifier 4_5 cannot be projected from the first projector $10_1$. The same holds true for the two second sub-markers having the second sub-identifiers 3_2 and 10_2. The processing circuit 123 therefore determines in step S107 that the positions of the plurality of sub-markers are not determined and proceeds to the process in step S108.

In step S108, the processing circuit 123 of each of the projectors $10_1$ to $10_N$ increments the number Q of sub-markers and proceeds to the process in step S105. For example, the processing section 25 of the controller 20 guides the user via the display 23 to the procedure of incrementing the number Q in accordance with the result of the evaluation performed by the processing circuit 123 in step S107. The processing circuit 123 increments the number Q when the input I/F 11 detects the procedure of incrementing the number Q. The number Q may be incremented by 1, or by 2 or more. In the example shown in FIG. 14, in which the number Q is 3, the number Q is incremented by 1 in step S108, so that the number Q in the next step S105 is 4.

Figure 15:
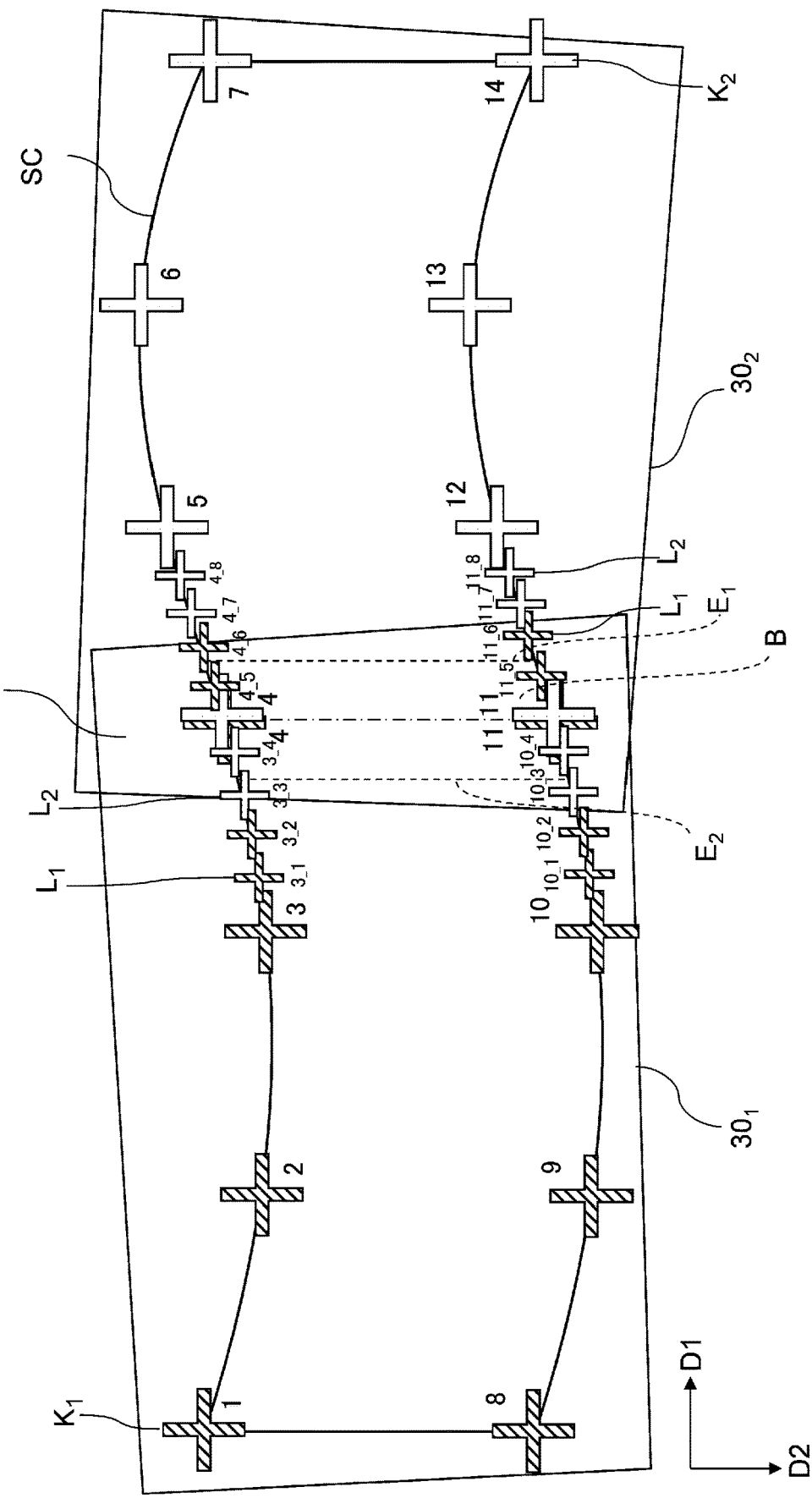
FIG. 15 describes the state in which the number of sub-markers is incremented from the number in FIG. 14.

The interval between the plurality of sub-markers is adjusted in steps S105 and S106, so that the interval between the sub-markers adjacent to each other is narrowed, whereby all the sub-markers can be projected and the positions thereof can be adjusted, as shown in FIG. 15. That is, in the example shown in FIG. 15, all the first sub-markers $L_1$ fall within the widest projection range over which the first image $30_1$ is projected, and all the second sub-markers $L_2$ fall within the widest projection range over which the second image $30_2$ is projected. As described above, the processes from steps S105 to S108 are repeated until the processing circuit 123 determines that the plurality of sub-markers are arranged at equal intervals so that the positions of the plurality of sub-markers have been determined.

On the other hand, when the number Q remains 3 and the sub-markers are arranged at equal intervals as shown in FIG. 13, the processing circuit 123 determines that the positions of the plurality of sub-markers have been determined in step S107 and proceeds to the process in step S109.

In step S109, the processing circuit 123 of each of the projectors $10_1$ to $10_N$ determines the contour of the partial image by using the basic information inputted in step S101, the positions of the plurality of main markers, and the positions of the plurality of sub-markers. Specifically, the processing circuit 123 determines a general contour of the partial image based on the positions of the plurality of main markers determined in step S104. The processing circuit 123 determines the contour of the partial image by determining the two edges of the blend area B based on the positions of the plurality of sub-markers determined in step S107. The determination of the contours of the plurality of partial images determines the contour of the whole image.

Figure 16:
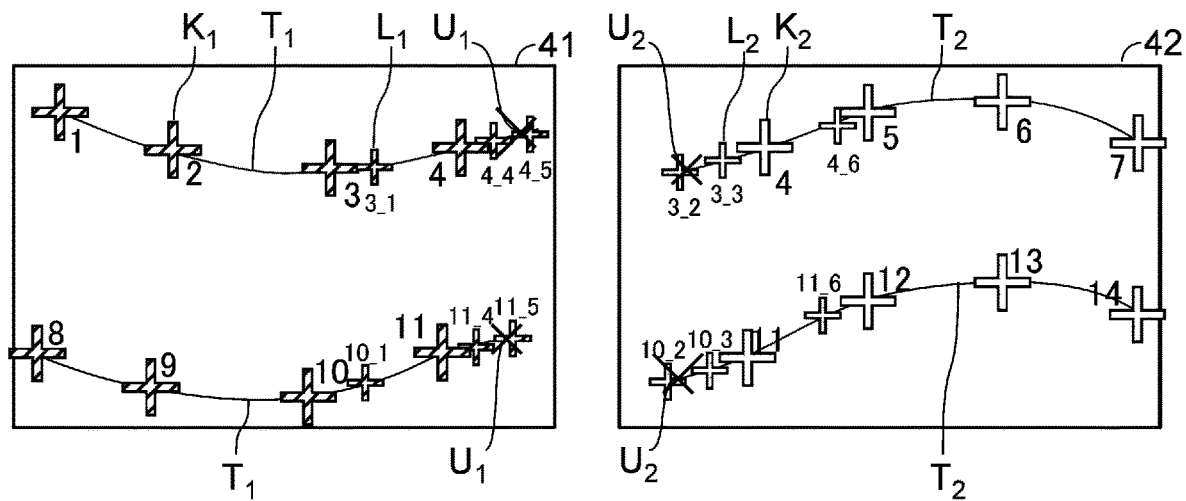
FIG. 16 describes the panel images in the case shown in FIG. 13.

The processing circuit 123 determines two first lines $T_1$, which pass through the plurality of first markers $K_1$ and the plurality of first sub-markers $L_1$ and form part of the contour of the first image $30_1$, as shown in FIG. 16. Specifically, the processing circuit 123 determines the upper first line $T_1$, which passes through the first markers $K_1$ having the first identifiers 1 to 4 and the first sub-markers $L_1$ having the first sub-identifiers 3_1, 4_4, and 4_5. The upper first line $T_1$ is a curved line extending from the first marker $K_1$ having the first identifier 1 to the first sub-marker $L_1$ having the first sub-identifier 4_5. The processing circuit 123 determines the lower first line $T_1$, which passes through the first markers $K_1$ having the first identifiers 8 to 11 and the first sub-markers $L_1$ having the first sub-identifiers 10_1, 11_4, and 11_5. The lower first line $T_1$ is a curved line extending from the first marker $K_1$ having the first identifier 8 to the first sub-marker $L_1$ having the first sub-identifier 11_5.

The processing circuit 123 determines two second lines $T_2$, which pass through the plurality of second markers $K_2$ and the plurality of second sub-markers $L_2$ and form part of the contour of the second image $30_2$. Specifically, the processing circuit 123 determines the upper second line $T_2$, which passes through the second markers $K_2$ having the second identifiers 4 to 7 and the second sub-markers $L_2$ having the second sub-identifiers 3_2, 3_3, and 4_6. The upper second line $T_2$ is a curved line extending from the second sub-marker $L_2$ having the second sub-identifier 3_2 to the second marker $K_2$ having the second identifier 7. The processing circuit 123 determines the lower second line $T_2$, which passes through the second markers $K_2$ having the second identifiers 11 to 14 and the second sub-markers $L_2$ having the second sub-identifiers 10_2, 10_3, and 11_6. The lower second line $T_2$ is a curved line extending from the second sub-marker $L_2$ having the second sub-identifier 10_2 to the second marker $K_2$ having the second identifier 14.

The processing circuit 123 determines the two first lines $T_1$ and the two second lines $T_2$ by calculating the functions, the boundary conditions, and other factors that represent the two first lines $T_1$ and the two second lines $T_2$ with the aid of interpolation. A variety of types of interpolation, such as cubic interpolation, spline interpolation, and polynomial interpolation, can be employed as the interpolation performed by the processing circuit 123 in accordance with the projection surface. The pair of first lines $T_1$ and the pair of second lines $T_2$ shown in FIG. 16 correspond to the edges of the screen SC in FIG. 13 and form continuous lines.

The processing circuit 123 determines, based on the amount of blending, first interpolation points $U_1$, which are points located on the first lines $T_1$ between the first interpolation markers and the first markers $K_1$ closest to the first interpolation markers out of the plurality of first markers $K_1$. That is, on the upper first line $T_1$, the first interpolation point $U_1$ is located between the first marker $K_1$ having the first identifier 4, which is the overlap marker, and the first sub-marker $L_1$ having the first sub-identifier 4_5. On the lower first line $T_1$, the first interpolation point $U_1$ is located between the first marker $K_1$ having the first identifier 11, which is the overlap marker, and the first sub-marker $L_1$ having the first sub-identifier 11_5.

The two first interpolation point $U_1$ are points that defines the first edge $E_1$ of the blend area B. That is, the first edge $E_1$ is the line that connects the upper first interpolation point $U_1$ to the lower first interpolation point $U_1$. The first edge $E_1$ is determined based, for example, on the line that connects the two overlap markers having the identifiers 4 and 11 and the amount of blending. The processing circuit 123 determines the contour of the first image $30_1$ by determining the line that connects the first markers K1 having the first identifiers 1 and 8, which are the start points of the two first lines $T_1$, to each other and the first edge $E_1$.

The processing circuit 123 determines second interpolation points $U_2$, which are points located on the second lines $T_2$ between the second interpolation markers and the second markers $K_2$ closest to the second interpolation markers out of the plurality of second markers $K_2$. That is, on the upper second line $T_2$, the second interpolation point $U_2$ is located between the second sub-marker $L_2$ having the second sub-identifier 3_2 and the second marker $K_2$ having the second identifier 4, which is the overlap marker. On the lower second line $T_2$, the second interpolation point $U_2$ is located between the second sub-marker $L_2$ having the second sub-identifier 10_2 and the second marker $K_2$ having the second identifier 11, which is the overlap marker.

The two second interpolation point $U_2$ are points that defines the second edge $E_2$ of the blend area B. That is, the second edge $E_2$ is the line that connects the upper second interpolation point $U_2$ to the lower second interpolation point $U_2$. The processing circuit 123 determines the contour of the second image $30_2$ by determining the line that connects the second markers $K_2$ having the second identifiers 7 and 14, which are the end points of the two second lines $T_2$, to each other and the second edge $E_2$.

In step S110, the processing circuit 123 of each of the projectors $10_1$ to $10_N$ calculates correction parameters used for the geometric correction of the partial image. The processing circuit 123 calculates the correction parameters necessary for the geometric correction that achieves the contour of the partial image determined in step S109. The processing circuit 123 outputs the calculated correction parameters to the geometric correction circuit 122.

In step S111, the geometric correction circuit 122 of each of the projectors $10_1$ to $10_N$ performs the geometric correction on the partial image by using the correction parameters calculated in step S110. That is, the geometric correction circuit 122 performs the geometric correction that achieves the contour of the partial image determined in step S109. The geometric correction can be performed by any of a variety of types of two-dimensional coordinate transformation. The projection instrument 13 thus projects the corrected partial image. The projection instruments 13 project the geometrically corrected partial images onto the screen SC, whereby a geometrically corrected whole image is projected onto the screen SC.

That is, the geometric correction circuit 122 of the first projector $10_1$ performs the geometric correction on the first image $30_1$ by using at least the first lines $T_1$ and the first edge $E_1$. Similarly, the geometric correction circuit 122 of the second projector $10_2$ performs the geometric correction on the second image $30_2$ by using the second lines $T_2$ and the second edge $E_2$. The first projector $10_1$ and the second projector $10_2$ thus project the first image $30_1$ and the second image $30_2$ onto the screen SC in such a way that the projected images contain the blend area B having the amount of blending set in the basic information on the multi-projection.

Figure 17:
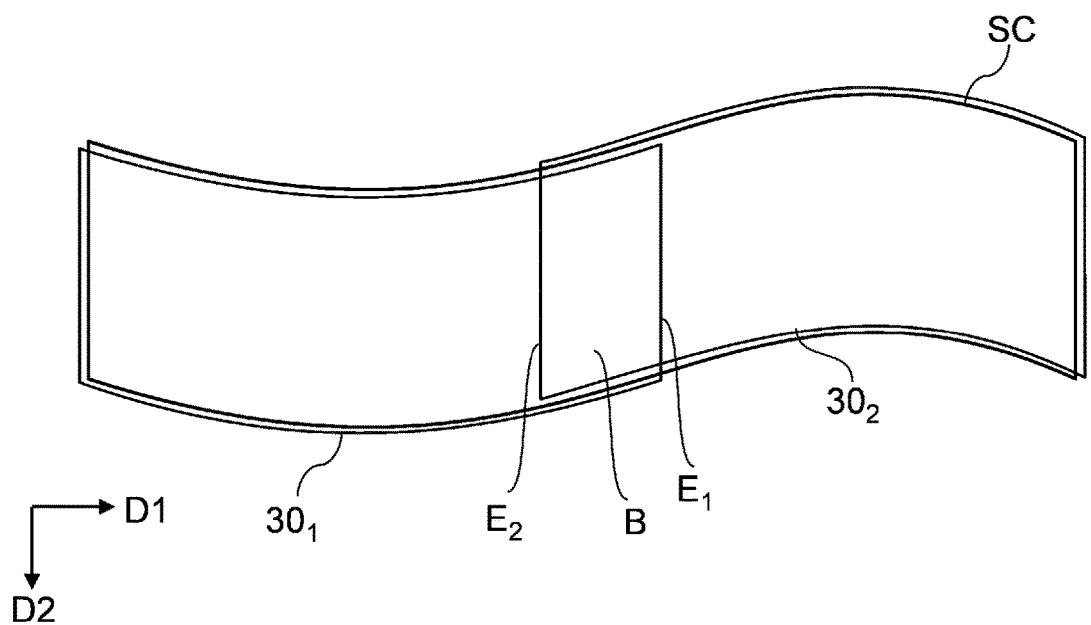
FIG. 17 describes the state in which a geometrically corrected whole image is projected.
Figure 18:
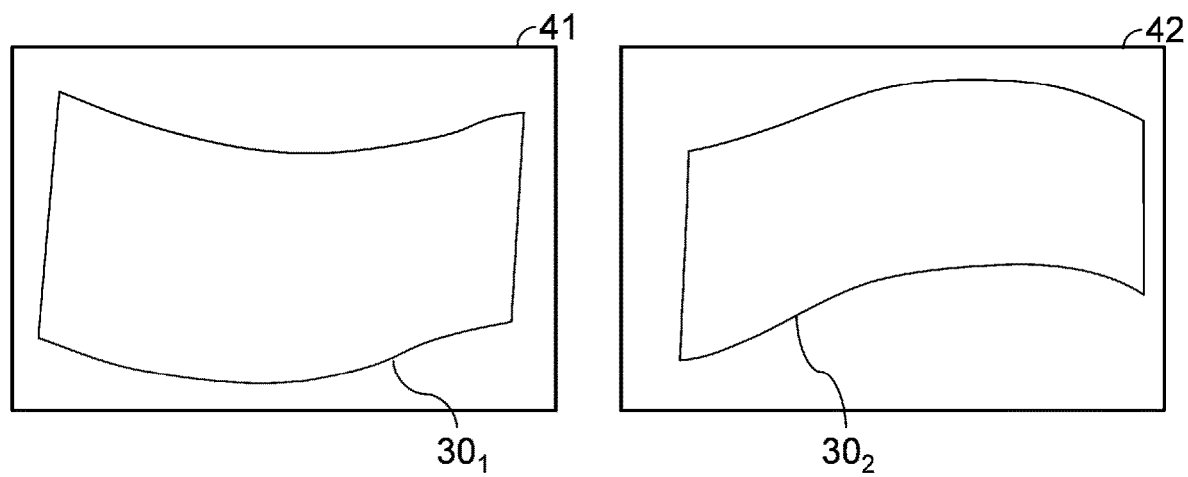
FIG. 18 describes the panel images in the case shown in FIG. 17.

The first image $30_1$, and the second image $30_2$ are so corrected that the contour of the whole image determined in step S109 is achieved, and the corrected images are projected onto the screen SC, as shown in FIGS. 17 and 18. The amount of blending in the blend area B has a value set in the basic information and is defined as the distance between the first edge $E_1$ and the second edge $E_2$. The first image $30_1$ and the second image $30_2$, which are each a geometrically corrected partial image, are projected onto the screen SC as described above, whereby a geometrically corrected whole image is projected onto the screen SC.

As described above, in the projection system 1 according to the present embodiment, the sub-markers used to determine the contour of each of the partial images each have an exterior appearance different from that of each of the main markers used to determine an approximate shape of the contour of the partial image. The plurality of main markers and the plurality of sub-markers are thus readily distinguished from each other in terms of intended use, whereby the convenience in determining the contour of each of partial images is improved.

Figure 19:
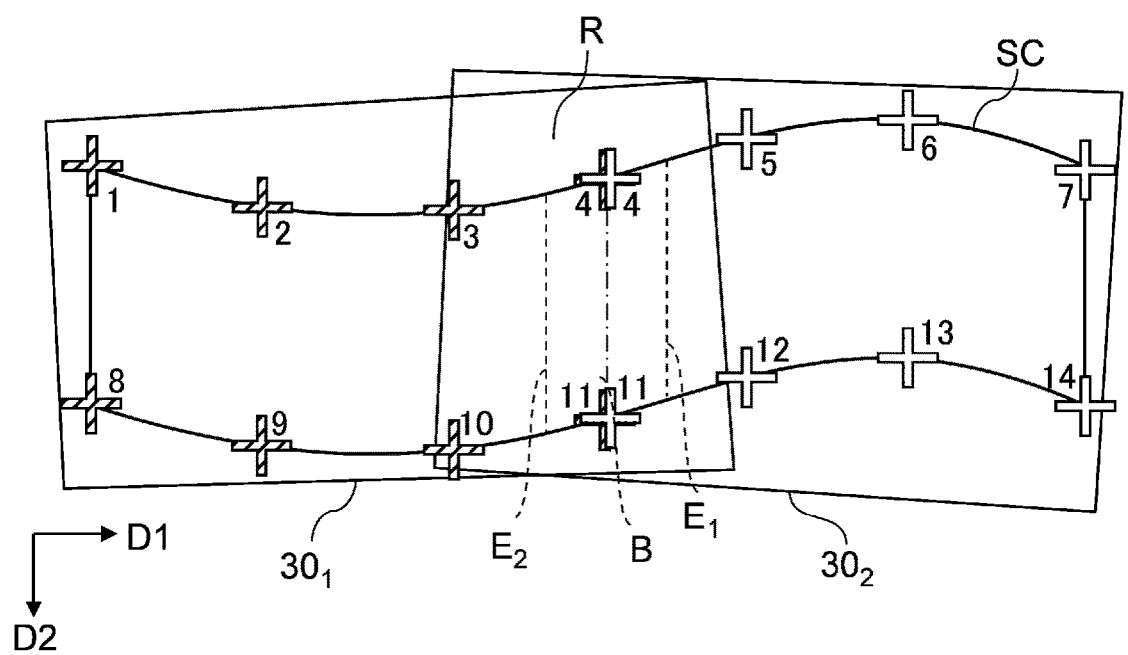
FIG. 19 describes a method for determining a blend area in a case where no sub-makers are used.
Figure 20:
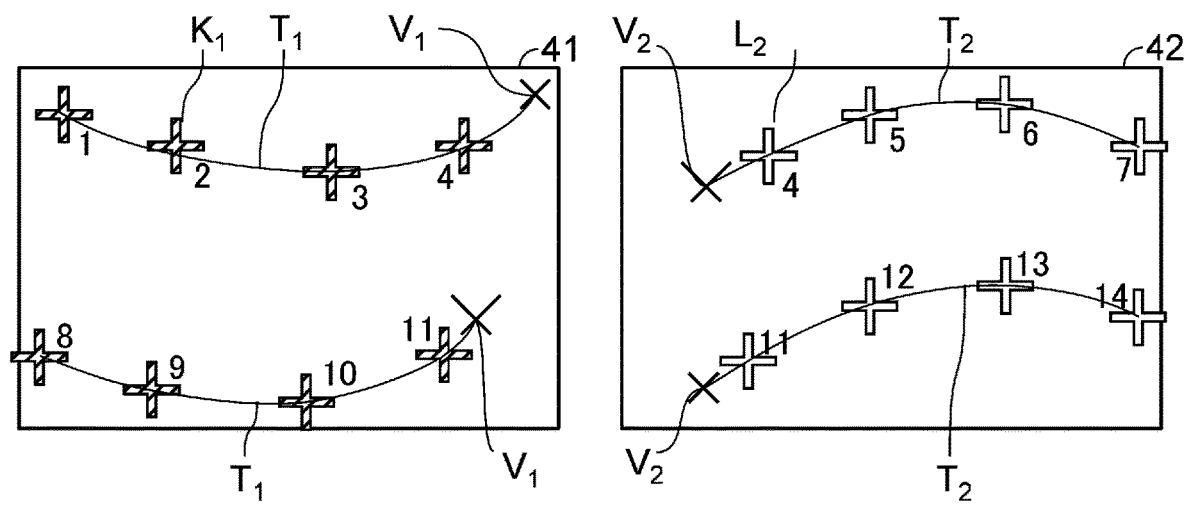
FIG. 20 describes the panel images in the case shown in FIG. 19.

If the first edge $E_1$ and the second edge $E_2$ of the blend area B are determined without using the sub-markers, a plurality of main markers, including the overlap markers, are first arranged at equal intervals along the edges of the screen SC, as shown in FIGS. 19 and 20. The two first lines $T_1$ are determined based on the positions of the plurality of first markers $K_1$, and the two second lines $T_2$ are determined based on the positions of the plurality of second markers $K_2$, as shown in FIG. 20.

The processing circuits 123 of the first projector 10$_1$ and the second projector 10$_2$ each need to determine the two first lines $T_1$ and the two second lines $T_2$ by extrapolation. That is, two first extrapolation points $V_1$, which define the first edge $E_1$, are disposed in positions shifted from the plurality of first markers $K_1$ toward the second image 30$_2$ in the first direction D1. Similarly, two second extrapolation points $V_2$, which define the second edge $E_2$, are disposed in positions shifted from the plurality of second markers $K_2$ toward the first image 30$_1$.

Figure 21:
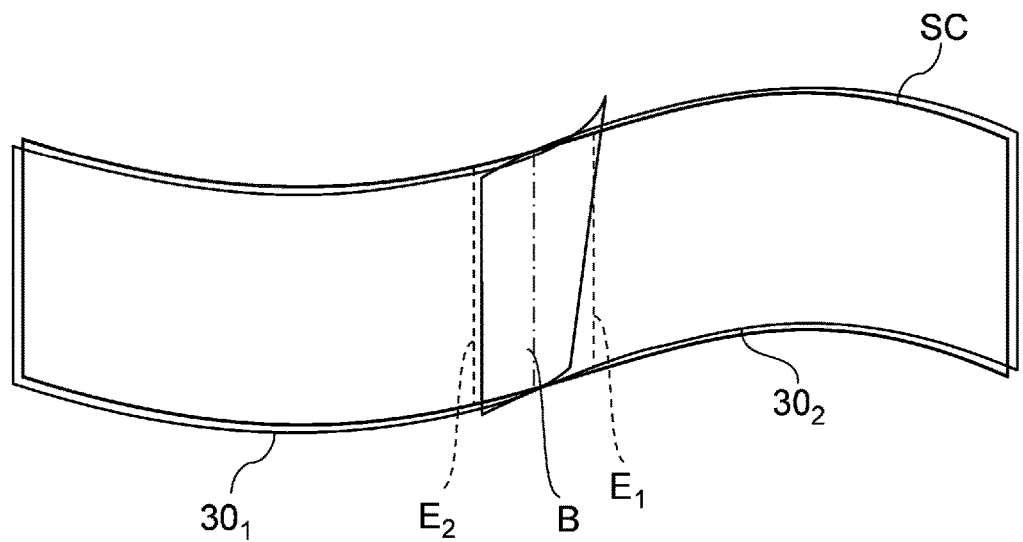
FIG. 21 describes the method for determining the blend area in the case where no sub-makers are used.
Figure 22:
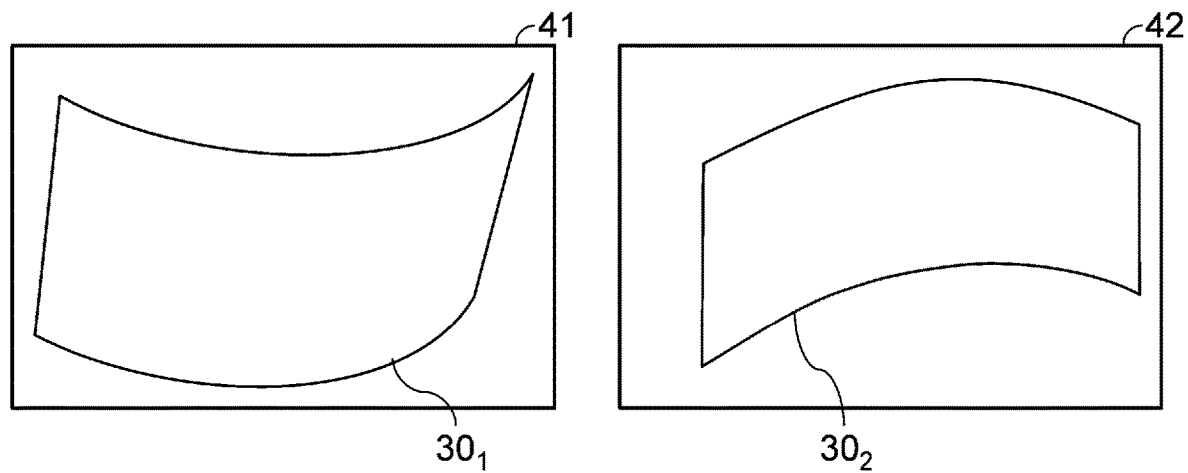
FIG. 22 describes the panel images in the case shown in FIG. 21.

Discrepancy of the first edges $E_1$ and the second edge $E_2$ from the contour of the assumed whole image, that is, the edges of the screen SC increases in some cases, as shown in FIGS. 21 and 22. When the discrepancy between the first image 30$_1$ and the second image 30$_2$ in the blend area B increases, a situation in which a proper whole image is not projected will arises. The extrapolation therefore has lower prediction accuracy than the interpolation, and in particular, extrapolation performed on a free-form curve produces significantly large errors in some cases. The errors can be reduced by increasing the number of main markers. It is, however, difficult to estimate in advance the number of main markers that reduce the errors to an acceptable level, so that the man-hours for and the difficulty in adjustment of the basic information is likely to increase.

In contrast, in the projection system 1 according to the present embodiment, the two points that define the first edges $E_1$ and the two points that define the second edge $E_2$ are determined by interpolation rather than extrapolation, whereby an increase in the discrepancy between the partial images in the blend area B can be suppressed.

A method for determining the identifiers of the plurality of main markers and the sub-identifiers of the plurality of sub-markers will be described below with reference to FIGS. 23 and 24.

Information shown below is first inputted in advance as the basic information for multi-projection. That is, the basic information contains a dimension $W_P$ of the partial image in the first direction D1, the amount of blending $W_B$, the number N of projectors 10$_1$ to 10$_N$, the number P of main markers in the first direction D1, and the number Q of sub-markers between main markers adjacent to each other. Under the definitions described above, an interval $INT_M$ between the main markers and an interval $INT_{Msub}$ between the sub-markers are determined by Expressions (1) and (2).

$$INT_M = W_P \times N - W_B \times (N-1) \tag{1}$$

$$INT_{Msub} = INT_M/(Q+1) \tag{2}$$

A method for determining X-th sub-identifiers of a plurality of X-th sub-markers $L_X$ will first be described. A dimension $W_X$ from the position where the first image 30$_1$ starts in the first direction D1 to an X-th edge $E_X$ of the blend area B where an X-th image 30$_X$ and an (X+1)-th image 30$_{X+1}$ are mixed with each other is determined by Expression (3).

$$W_X = X \times W_P - W_B \times (X-1) \tag{3}$$

The X-th sub-identifiers of the X-th interpolation markers contained in the plurality of X-th sub-markers $L_X$ are called X-th interpolation identifiers, with the upper X-th interpolation identifier called "$P_{AXt}\_Q_{AX}$", and the lower X-th interpolation identifier called "$P_{AXb}\_Q_{AX}$". In this case, the primary numbers $P_{AXt}$ and $P_{AXb}$ and the secondary number $Q_{AX}$ are determined by Expressions (4) to (6). In Expression (6), the term "$W_P\% INT_M$" means the remainder as a result of division of $W_P$ by $INT_M$.

$$P_{AXt} = W_X/INT_M + 1 \tag{4}$$

$$P_{AXb} = W_X/INT_M + 1 + P \tag{5}$$

$$Q_{AX} = (W_P \% INT_M)/INT_{Msub} + 1 \tag{6}$$

If the secondary number $Q_{AX}$ is greater than the number Q of sub-markers having been set, the processing circuit 123 may determine in step S107 that the position of the sub-markers are not determined, and proceed to the process in step S108.

The X-th sub-identifiers of the X-th index markers contained in the plurality of X-th sub-markers $L_X$ are called X-th index identifiers, with the upper X-th index identifier called "$P_{BXt}\_Q_{BX}$", and the lower X-th index identifier called "$P_{BXb}\_Q_{BX}$". In this case, the primary numbers $P_{BXt}$ and $P_{BXb}$ are determined by Expressions (7) to (8).

$$P_{BXt} = P_{A(X+1)t} \tag{7}$$

$$P_{Bxb} = P_{A(X+1)b} \tag{8}$$

The secondary number $Q_{BX}$ is determined in accordance with the following case classification using a secondary number $Q_{A(X+1)}$ of (X+1)-th interpolation identifiers. First, when $Q_{A(X+1)} - 1 < 0$, no X-th index marker exists, and the secondary number $Q_{BX}$ of each of the X-th index identifiers does therefore not exist either. Thereafter, when $Q_{A(X+1)} - 1 = 1$, the secondary number $Q_{BX}$ is determined by Expression (9).

$$Q_{BX} = Q_{A(X+1)} - 1 \tag{9}$$

Finally, when $Q_{A(X+1)} - 1 > 1$, the secondary number $Q_{BX}$ is determined by Expression (10).

$$Q_{BX} = \{1, \ldots, Q_{A(X+1)} - 2, Q_{A(X+1)} - 1\} \tag{10}$$

That is, when $Q_{A(X+1)} - 1 > 1$, the number of X-th index markers corresponds to the number $Q_{BX}$ determined by Expression (10).

A method for determining (X+1)-th sub-identifiers of a plurality of (X+1)-th sub-markers $L_{X+1}$ will next be described. A dimension $W_{X+1}$ from the position where the first image 30$_1$ starts in the first direction D1 to an (X+1)-th edge $E_{X+1}$ of the blend area B where the X-th image 30$_X$ and the (X+1)-th image 30$_{X+1}$ are mixed with each other is determined by Expression (11).

$$W_{X+1} = X \times (W_P - W_B) \tag{11}$$

The (X+1)-th sub-identifiers of the (X+1)-th interpolation markers contained in the plurality (X+1)-th sub-markers $L_{X+1}$ are called (X+1)-th interpolation identifiers, with the upper (X+1)-th interpolation identifier called "$P_{A(X+1)t}\_Q_{A(X+1)}$", and the lower (X+1)-th interpolation identifier called "$P_{A(X+1)b}\_Q_{A(X+1)}$". In this case, the primary numbers $P_{A(X+1)t}$ and $P_{A(X+1)b}$ and the secondary number $Q_{A(X+1)}$ are determined by Expressions (12) to (14).

$$P_{A(X+1)t} = W_{X+1}/INT_M + 1 \tag{12}$$

$$P_{A(X+1)b} = W_{X+1}/INT_M + 1 + P \tag{13}$$

$$Q_{A(X+1)} = (W_{X+1} \% INT_M)/INT_{Msub} \tag{14}$$

The first (X+1)-th sub-identifiers of (X+1)-th index markers contained in the plurality of (X+1)-th sub-markers $L_{X+1}$ are called (X+1)-th index identifiers, with the upper (X+1)-th index identifier called "$P_{B(X+1)t}$_$Q_{B(X+1)}$", and the lower (X+1)-th index identifier called "$P_{B(X+1)b}$_$Q_{B(X+1)}$". In this case, the primary numbers $P_{B(X+1)t}$ and $P_{B(X+1)b}$ are determined by Expressions (15) and (16).

$$P_{B(X+1)t} = P_{AXt} \quad (15)$$

$$P_{B(X+1)b} = P_{AXb} \quad (16)$$

The secondary number $Q_{B(X+1)}$ is determined in accordance with the following case classification using the secondary number $Q_{AX}$ of the X-th interpolation identifiers. First, when $Q_{AX}+1>Q$, no (X+1)-th index marker exists, and the secondary number $Q_{B(X+1)}$ of each of the (X+1)-th index identifiers does therefore not exist either. Thereafter, when $Q_{AX}+1=Q$, the secondary number $Q_{B(X+1)}$ is determined by Expression (17).

$$Q_{B(X+1)} = Q_{AX}+1 \quad (17)$$

Finally, when $Q_AX+1<Q$, the secondary number $Q_{B(X+1)}$ is determined by Expression (18).

$$Q_{B(X+1)} = \{Q_{AX}+1, Q_{AX}+2, \ldots, Q\} \quad (18)$$

That is, when $Q_{AX}+1<Q$, the number of (X+1)-th index markers corresponds to the number $Q_{B(X+1)}$ determined by Expression (18).

Figure 23:
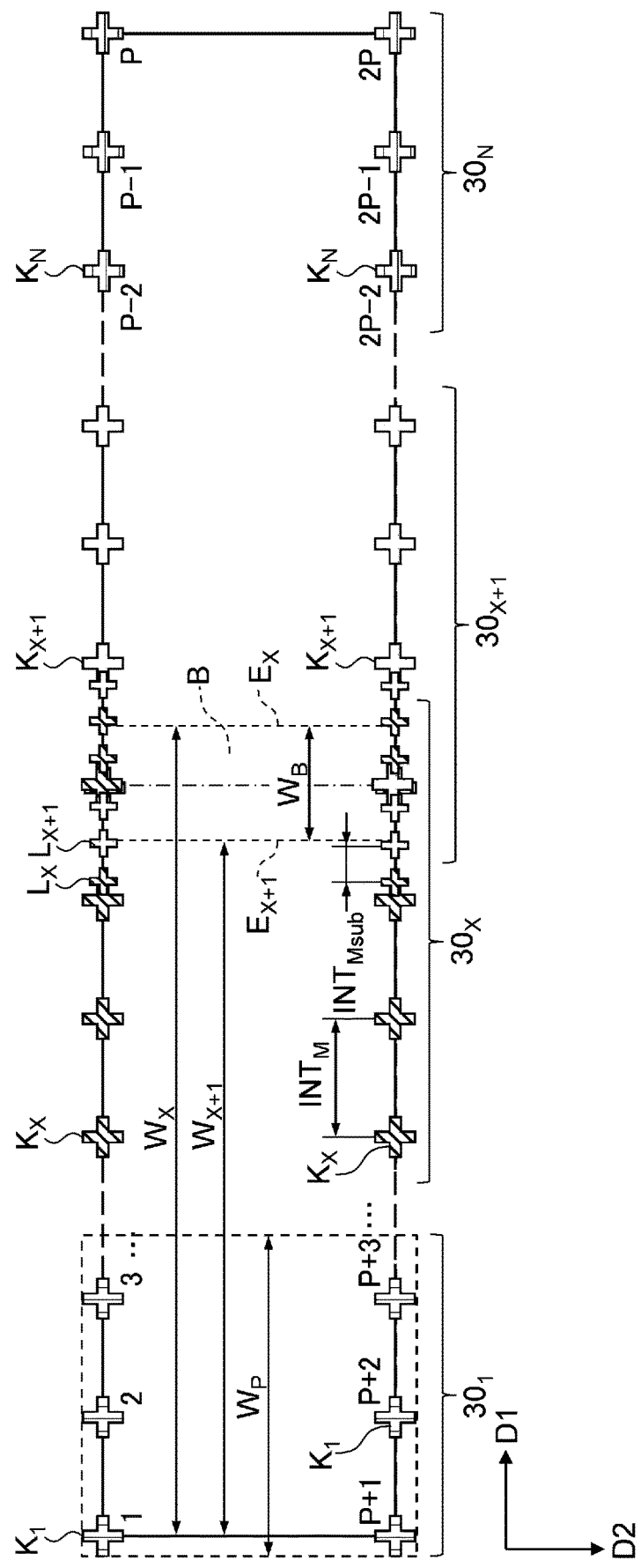
FIG. 23 describes a method for determining identifiers.

In the example shown in FIG. 23, identifiers from 1 to 2P are assigned to the main markers, such as the first marker $K_1$, the X-th marker $K_X$, the (X+1)-th marker $K_{X+1}$, and the N-th marker $K_N$. For example, the identifiers of the pair of overlap markers in the blend area B where the X-th image $30_X$ and the (X+1)-th image $30_{X+1}$ are mixed with each other are $P_{AXt}$ and $P_{AXb}$, which are determined, for example, by Expressions (4) and (5). Identifiers can thus be assigned to the plurality of main markers by calculating the identifiers of the overlap markers for all the blend areas B in the whole image.

Specifically, the pair of X-th markers $K_X$ having the identifiers of the overlap markers are set as the start positions, and each time 1 is subtracted from the identifiers at the start positions, the values resulting from the subtraction are assigned to the next main markers adjacent in the direction opposite the first direction D1. Similarly, the pair of (X+1)-th markers $K_{X+1}$ having the identifiers of the overlap markers are set as the start positions, and each time 1 is added to the identifiers at the start positions, the values resulting from the addition are assigned to the next main markers adjacent in the first direction D1. Identifiers can be assigned to all the main markers by repeating the process described above until the values resulting from the subtraction become 1 and P+1, the values resulting from the addition become P and 2P, or the values become the identifiers of the next overlap markers.

As described above, the image projection method described in the embodiment includes projecting the plurality of first markers $K_1$ onto the screen SC, projecting one or more first sub-markers $L_1$ each having an exterior appearance different from that of each of the plurality of first markers $K_1$ onto the screen SC, determining the positions of the plurality of first markers $K_1$ on the screen SC, determining the positions of the first sub-markers $L_1$ on the screen SC, determining an approximate shape of the contour of the first image $30_1$ by using the positions of the plurality of first markers $K_1$, determining the first lines $T_1$, which form the contour of the first image $30_1$, and the first edge $E_1$, which forms the contour of the first image $30_1$ and is an edge of the blend area B, where the first image $30_1$ and the second image $30_2$ different from the first image $30_1$ are mixed with each other, by using the positions of the plurality of first markers $K_1$ and the positions of the first sub-markers $L_1$, and projecting the first image $30_1$ onto the screen SC so as to contain the blend area B. According to the image projection method described above, the first sub-markers $L_1$ used to determine the contour of the first image $30_1$ each have an exterior appearance different from that of each of the first markers $K_1$ used to determine an approximate shape of the contour of the first image $30_1$. The plurality of first markers $K_1$ and the plurality of first sub-markers $L_1$ can therefore be readily distinguished from each other in terms of intended use, whereby the convenience in determining the contour of the first image $30_1$ is improved.

According to the image projection method described in the embodiment, the positions of the plurality of first markers $K_1$ are determined by detecting input for adjusting the positions of the plurality of first markers $K_1$, and the positions of the first sub-markers $L_1$ are determined by detecting input for adjusting the positions of the first sub-markers $L_1$. The positions of the plurality of first markers $K_1$ and the positions of the first sub-markers $L_1$ can thus be adjusted.

According to the image projection method described in the embodiment, the geometric correction is performed on the first image $30_1$ by using the first lines $T_1$ and the first edge $E_1$. The positions of the plurality of first markers $K_1$ and the first sub-markers $L_1$ therefore readily allow the geometric correction of the first image $30_1$.

According to the image projection method described in the embodiment, the projection of the first sub-markers $L_1$ is initiated after the positions of the plurality of first markers $K_1$ are determined. The positions of first sub-markers $L_1$ may therefore be determined after the determination of the positions of the plurality of first markers $K_1$, whereby the complexity of the determination processes can be suppressed, and the convenience of the image projection method is improved.

The image projection method described in the embodiment further includes projecting the plurality of second markers $K_2$ onto the screen SC, projecting one or more second sub-markers $L_2$ each having an exterior appearance different from that of each of the plurality of second markers $K_2$ onto the screen SC, determining the positions of the plurality of second markers $K_2$ on the screen SC, determining the positions of the second sub-markers $L_2$ on the screen SC, determining an approximate shape of the contour of the second image $30_2$ by using the positions of the plurality of second markers $K_2$, and determining the second lines $T_2$, which form part of the contour of the second image $30_2$, and the second edge $E_2$ of the blend area B by using the positions of the plurality of second markers $K_2$ and the positions of the second sub-markers $L_2$. The second sub-markers $L_2$ used to determine the contour of the second image $30_2$ each have an exterior appearance different from that of each of the second markers $K_2$ used to determine an approximate shape of the contour of the second image $30_2$. The plurality of second markers $K_2$ and the plurality of second sub-markers $L_2$ can therefore be readily distinguished from each other in terms of intended use, whereby the convenience in determining the contour of the second image $30_2$ is improved.

According to the image projection method described in the embodiment, the projection of the first sub-markers $L_1$ and the second sub-markers $L_2$ is initiated after the positions of the plurality of first markers $K_1$ and the plurality of second markers $K_2$ are determined. The positions of first sub-markers $L_1$ and the second sub-markers $L_2$ may therefore be determined after the determination of the positions of the plurality of first markers $K_1$ and the plurality of second markers $K_2$, whereby the complexity of the determination processes can be suppressed, and the convenience of the image projection method is improved.

According to the image projection method described in the embodiment, the number of second sub-markers $L_2$ is equal to the number of first sub-markers $L_1$. The positions of the second sub-markers $L_2$ can therefore be determined in the same procedure as the procedure in accordance with which the positions of the first sub-markers $L_1$ are determined, whereby the convenience of the image projection method is improved.

The image projection method described in the embodiment further includes projecting the plurality of first identifiers corresponding to the plurality of first markers $K_1$ onto the screen SC along with the plurality of first markers $K_1$, and projecting the first sub-identifiers corresponding to the first sub-markers $L_1$ onto the screen SC along with the first sub-markers $L_1$. The first markers $K_1$ and the first sub-markers $L_1$ projected on the screen SC are therefore more readily distinguished from each other.

According to the image projection method described in the embodiment, the first sub-identifiers have information corresponding to the first identifiers of the first markers $K_1$ closest to the first sub-markers $L_1$ out of the plurality of first markers $K_1$. Information on the positions where the first sub-markers $L_1$ should be placed can therefore be presented, whereby the convenience of the image projection method is improved.

According to the image projection method described in the embodiment, input for determining the number Q of first sub-markers $L_1$ is detected. The number Q of first sub-markers $L_1$ that is desired by the user can therefore be determined.

According to the image projection method described in the embodiment, the initial positions where the first sub-markers $L_1$ are projected fall within an area facing the second image $30_2$ within the widest range over which the first image $30_1$ can be projected. The first sub-markers $L_1$ are disposed, before projected, in an area in the vicinity of the positions where the first sub-markers $L_1$ should be disposed, whereby the convenience of the image projection method is improved.

As described above, the first projector $10_1$ described in the embodiment includes the projection instrument 13, which projects the plurality of first markers $K_1$ onto the screen SC, projects one or more first sub-markers $L_1$ each having an exterior appearance different from that of each of the plurality of first markers $K_1$ onto the screen SC, and projects the first image $30_1$ onto the screen SC in such a way that the first image $30_1$ contains the blend area B, where the first image $30_1$ and the second image $30_2$ different from the first image $30_1$ are mixed with each other, the input I/F 11, which detects input for determining the positions of the plurality of first markers $K_1$ on the screen SC and input for determining the positions of the first sub-markers $L_1$ on the screen SC, and the processing circuit 123, which determines an approximate shape of the contour of the first image $30_1$, by using the positions of the plurality of first markers $K_1$, and determines the first lines $T_1$, which form part of the contour of the first image $30_1$, and the first edge $E_1$, which forms part of the contour of the first image $30_1$ and is an edge of the blend area B, by using the positions of the plurality of first markers $K_1$ and the first sub-markers $L_1$. According to the first projector $10_1$ described above, the first sub-markers $L_1$ used to determine the contour of the first image $30_1$ each have an exterior appearance different from that of each of the first markers $K_1$ used to determine an approximate shape of the contour of the first image $30_1$. The plurality of first markers $K_1$ and the plurality of first sub-markers $L_1$ can therefore be readily distinguished from each other in terms of intended use, whereby the convenience in determining the contour of the first image $30_1$ is improved.

As described above, the image projection method described in the embodiment includes projecting the plurality of first markers $K_1$, and the first interpolation markers each having an exterior appearance different from that of each of the plurality of first markers $K_1$ onto the screen SC, determining the positions of the plurality of first markers $K_1$ and the first interpolation markers on the screen SC in such a way that the first interpolation markers are disposed in positions shifted from the plurality of first markers $K_1$ toward the second image $30_2$ in the first direction D1, in which the first image $30_1$ projected on the screen SC and the second image $30_2$, which is projected on the screen SC and differs from the first image $30_1$, are sequentially arranged, determining the first lines $T_1$, which pass through the plurality of first markers $K_1$ and the first interpolation markers and form part of the contour of the first image, determining the first edge $E_1$, which is connected to points located on the first lines $T_1$ between the first interpolation markers and the first markers $K_1$ closest to the first interpolation markers out of the plurality of first markers $K_1$, the first edge $E_1$ forming part of the contour of the first image $30_1$ and being an edge of the blend area B, where the first image $30_1$ and the second image $30_2$ are mixed with each other, performing geometric correction on the first image $30_1$ by using the first lines $T_1$ and the first edge $E_1$, and projecting the first image $30_1$ onto the screen SC so as to contain the blend area B. According to the image projection method described above, in which the two points that define the first edge $E_1$ are determined by interpolation rather than extrapolation, whereby an increase in the discrepancy between the first image $30_1$ and the second image $30_2$ in the blend area B can be suppressed.

According to the image projection method described in the embodiment, the positions of the plurality of first markers $K_1$ and the first interpolation markers are determined by detecting input for adjusting the positions of the plurality of first markers $K_1$ and the first interpolation markers. The positions of the plurality of first markers $K_1$ and the positions of the first interpolation markers can thus be adjusted.

According to the image projection method described in the embodiment, the first lines $T_1$ are each a curved line. The shapes of the first lines $T_1$, which pass through the plurality of first markers $K_1$ and the first interpolation markers, can therefore be more smoothly interpolated.

The image projection method described in the embodiment further includes detecting input for setting the amount of blending that defines the dimension of the blend area B in the first direction D1, and the first edge $E_1$ is determined based on the amount of blending. The first edge $E_1$ can therefore be determined in accordance with the amount of blending arbitrarily set by the user, whereby the geometric correction can be more readily performed.

The image projection method described in the embodiment further includes projecting a plurality of first identifiers corresponding to the plurality of first markers $K_1$ onto the screen SC along with the plurality of first markers $K_1$, and projecting first interpolation identifiers corresponding to the first interpolation markers onto the screen SC along with the first interpolation markers. The first markers $K_1$ and the first interpolation markers projected on the screen SC are therefore more readily distinguished from each other.

According to the image projection method described in the embodiment, the first interpolation identifiers have information corresponding to the first identifiers of the first markers $K_1$ closest to the first interpolation markers. Information on the positions where the first interpolation markers should be placed can therefore be presented, whereby the convenience of the image projection method is improved.

According to the image projection method described in the embodiment, the plurality of first identifiers have consecutive numbers assigned to the plurality of first markers $K_1$ along the first direction D1, and the first interpolation identifiers have information corresponding to the consecutive numbers corresponding to the first identifiers assigned to the first markers $K_1$ closest to the first interpolation markers. Information on the positions where the first interpolation markers should be placed can therefore be presented, whereby the convenience of the image projection method is improved.

The image projection method described in the embodiment further includes projecting the plurality of second markers $K_2$ onto a screen SC, and determining the positions of the plurality of second markers $K_2$ in such a way that one or more of the plurality of first markers $K_1$ and one or more of the plurality of second markers $K_2$ overlap with each other as the overlap markers and all of the plurality of second markers $K_2$ except for the overlap markers are disposed in positions shifted in the first direction D1 from the plurality of first markers $K_1$ toward the second image $30_2$. The first image $30_1$ and the second image $30_2$ are therefore mixed with each other in the blend area B, whereby the position of the first image $30_1$ and the positions of the second image $30_2$ on the screen SC can be coordinated with each other.

The image projection method described in the embodiment further includes projecting the plurality of first sub-markers $L_1$, which are a plurality of sub-markers including each of the first interpolation markers as one sub-marker, onto the screen SC. The first lines $T_1$ and the second lines $T_2$, which pass through the plurality of second markers $K_2$ and form part of the contour of the second image $30_2$, form continuous lines continuous with each other, and when the plurality of first markers $K_1$ excluding the overlap markers, the overlap markers, and the plurality of second markers $K_2$ excluding the overlap markers are disposed on the continuous lines, and the plurality of first sub-markers $L_1$, which are the plurality of sub-markers, are disposed on the continuous lines between the overlap markers and the second markers $K_2$ adjacent to the overlap markers, the first interpolation markers are adjacent to the first edge $E_1$. An increase in the discrepancy between the first image $30_1$ and the second image $30_2$ having undergone the geometric correction can thus be further suppressed.

According to the image projection method described in the embodiment, the plurality of first sub-markers $L_1$, which are the plurality of sub-markers, each have an exterior appearance different from that of each of the plurality of first markers $K_1$. The first markers $K_1$ and the plurality of sub-markers projected on the screen SC are therefore more readily distinguished from each other.

According to the image projection method described in the embodiment, the plurality of first sub-markers $L_1$, which are the plurality of sub-markers, each have an exterior appearance distinguishable from that of each of the first interpolation markers. The first interpolation markers can thus be more readily distinguished from the plurality of first sub-markers $L_1$.

According to the image projection method described in the embodiment, the plurality of first sub-identifiers corresponding to the plurality of first sub-markers $L_1$, which are the plurality of sub-markers, and having consecutive numbers assigned along the first direction D1 are projected onto the screen SC along with the plurality of first sub-markers $L_1$, which are the plurality of sub-markers. Information on the positions where the plurality of sub-markers should be placed can therefore be presented, whereby the convenience of the image projection method is improved.

The image projection method described in the embodiment further includes detecting input for determining the number Q of plurality of first sub-markers $L_1$, which are the plurality of sub-markers, and when the consecutive numbers of the first sub-identifiers assigned to the first sub-markers $L_1$ that are the first interpolation markers and sub-markers are greater than the number of the plurality of first sub-markers $L_1$, which are the plurality of sub-markers, the user is guided to the procedure of incrementing the number Q of the plurality of first sub-markers $L_1$, which are the plurality of sub-markers. The user can thus prevent the number Q of the plurality of first sub-markers $L_1$, which is the number of the plurality of sub-markers, from being set at an inappropriate value.

As described above, the first projector $10_1$ described in the embodiment includes the projection instrument 13, which projects the plurality of first markers $K_1$ and the first interpolation markers each having an exterior appearance different from that of each of the plurality of first markers $K_1$ onto the screen SC, and projects the first image $30_1$ onto the screen SC in such a way that the first image $30_1$ contains the blend area B, where the first image $30_1$ and the second image $30_2$ different from the first image $30_1$ are mixed with each other, the input I/F 11, which detects input for determining the positions of the plurality of first markers $K_1$ and the first interpolation markers on the screen SC in such a way that the first interpolation markers are disposed in positions shifted from the plurality of first markers $K_1$ toward the second image $30_2$ in the first direction D1, in which the first image $30_1$ and the second image $30_2$ are sequentially arranged, the processing circuit 123, which determines the first lines $T_1$, which pass through the plurality of first markers $K_1$ and the first interpolation markers and form part of the contour of the first image $30_1$, and determines the first edge $E_1$, which is connected to points located on the first lines $T_1$ between the first interpolation markers and the first markers $K_1$ closest to the first interpolation markers out of the plurality of first markers $K_1$, the first edge $E_1$ forming part of the contour of the first image $30_1$ and being an edge of the blend area B, where the first image $30_1$ and the second image $30_2$ are mixed with each other, and the geometric correction circuit 122, which performs geometric correction on the first image $30_1$ by using the first lines $T_1$ and the first edge $E_1$. According to the first projector $10_1$ described above, in which the two points that define the first edge $E_1$ are determined by interpolation rather than extrapolation, an increase in the discrepancy between the first image $30_1$ and the second image $30_2$ in the blend area B can be suppressed.

OTHER EMBODIMENTS

The embodiment has been described above, but the present disclosure is not limited to the disclosed embodiment. The configuration of each portion may be replaced with an arbitrary configuration having the same function, and an arbitrary configuration in the embodiment may be omitted or added within the technical scope of the present disclosure. The disclosure described above thus allows a person skilled in the art to conceive of a variety of alternative embodiments.

For example, the plurality of sub-markers may each have an exterior appearance distinguishable from that of each of the interpolation markers. For example, the user can determine the positions of the first interpolation markers by highlighting only the first interpolation markers out of the plurality of first sub-markers $L_1$, whereby the positions of the plurality of first sub-markers $L_1$ can be readily adjusted. The first sub-identifiers may instead each have an exterior appearance distinguishable from that of each of the first interpolation identifiers. Furthermore, the identifiers, such as the first identifiers and the first sub-identifiers, may have alphabetic characters, Greek characters, or any other characters in place of consecutive numbers. For example, when the number Q of sub-markers is 3, the three secondary numbers of each of the sub-identifiers may be "L", "C", and "R" that mean left, center, and right, respectively.

The plurality of main markers and the plurality of sub-markers are not necessarily arranged along the contour of the whole image, and may instead be arranged to form grid points. For example, in the example shown in FIG. 9 and other figures, the plurality of main markers are arranged in a 2×7 matrix, and may instead be arbitrarily arranged, such as in the form of a 3×5 or 4×8 matrix in accordance with the basic information for multi-projection. That is, the plurality of partial images projected by the projectors $10_1$ to $10_N$ may be arranged in the vertical direction as well as in the horizontal direction.

Figure 4:
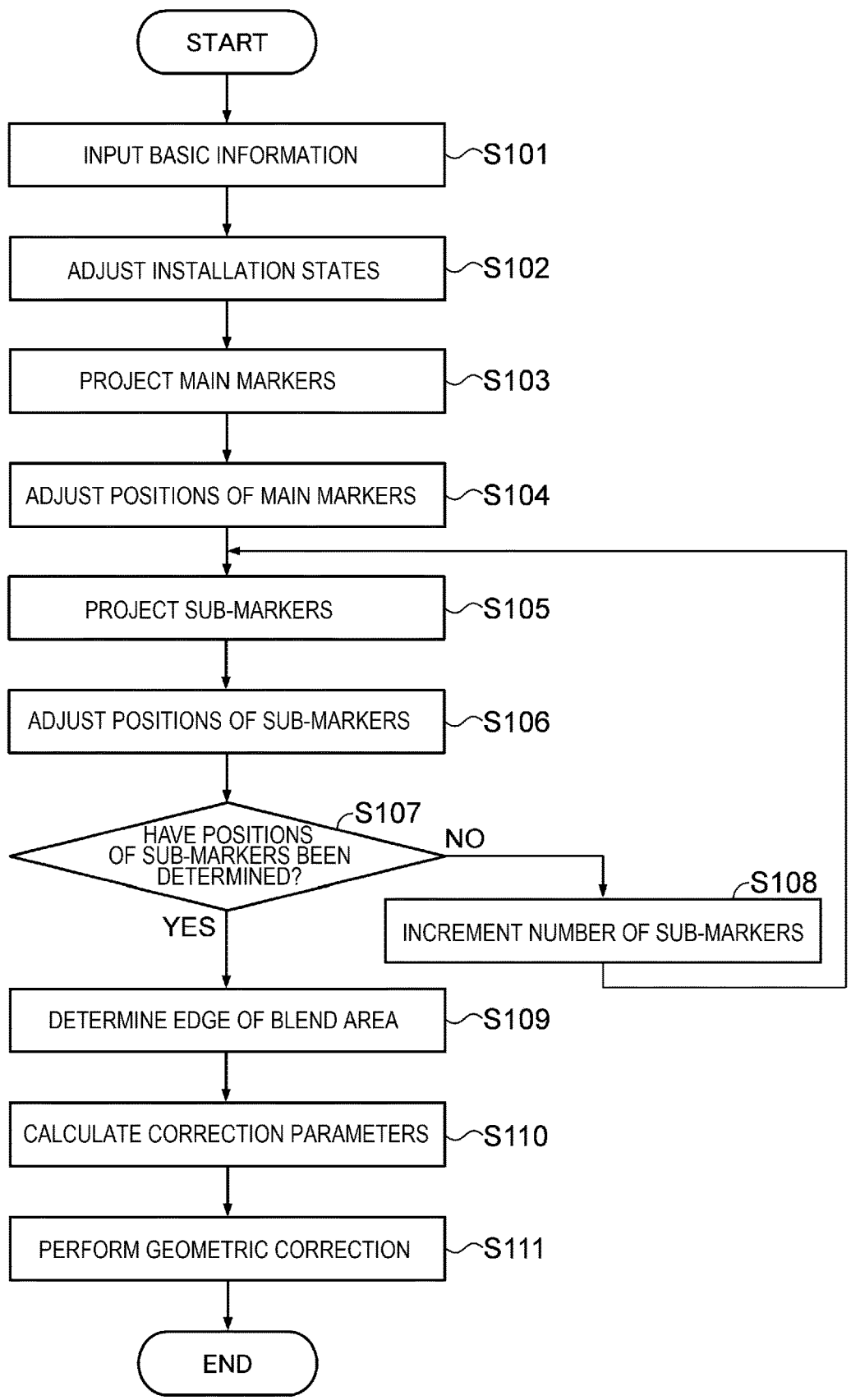
FIG. 4 is a flowchart for describing an example of an image projection method executed by the projection system.

In the above description of step S105 in the flowchart of FIG. 4, the projection of the plurality of first sub-markers $L_1$ and the plurality of second sub-markers $L_2$ is initiated after the positions of the plurality of first markers $K_1$ and the plurality of second markers $K_2$ are determined, and the description is presented only by way of example. The projection of the plurality of first sub-markers $L_1$ and the plurality of second sub-markers $L_2$ may be initiated simultaneously with the projection of the plurality of first markers $K_1$ and the plurality of second markers $K_2$.

In the above description of step S107 in the flowchart of FIG. 4, the processing circuit 123 determines that the positions of the plurality of sub-markers are not determined, for example, by the user's input when the interpolation markers are not achieved, and the description is presented only by way of example. For example, the processing circuit 123 may determine that the positions of the plurality of sub-markers are not determined when the positions of the first interpolation markers, which are adjusted via the input I/F 11, reach a boundary line indicating the widest range over which the first image $30_1$ can be projected. In this case, the user may be guided to the procedure of incrementing the number Q of sub-markers in step S108, or the number Q of sub-markers may be incremented automatically. The step of determining the number Q can be thus simplified.

In the example shown in FIG. 3 and other figures, the edge of the screen SC and the contour of the whole image are slightly shifted from each other for simplicity of description, but may coincide with each other in practice. The same holds true for the overlap markers in FIG. 9 and other figures. In addition, part of the functions of the processing section 25 may be achieved by the processing circuit 123, or part of the functions of the processing circuit 123 may be achieved by the processing section 25.

In the embodiment described above, the dimension $W_P$, which represents the resolution of each of the projectors $10_1$ to $10_N$, and the amount of blending $W_B$, which represents the dimension of the blend area B, are each a single value in the description. The dimension $W_P$ and the amount of blending $W_B$ may each, however, not be a single value. In this case, for example, $W_P \times N$ in Expression (1) may be replaced with the sum of $W_P$, and $W_B \times (N-1)$ may be replaced with the sum of $W_B$. $X \times W_P$ in Expression (3) may be replaced with the sum of $W_P$ from the first image $30_1$ to the X-th image $30_X$, and $W_B \times (X-1)$ may be replaced with the sum of $W_B$ from the first image $30_1$ to the (X-1)-th image $30_{X-1}$.

As described above, the image projection method described in the other embodiments guides the user to the procedure of incrementing the number Q of first sub-markers $L_1$ projected onto the screen SC when the positions of the first sub-markers $L_1$ reach the boundary line indicating the widest range over which the first image $30_1$ can be projected. According to the image projection method, the user can increment the number Q of first sub-markers $L_1$ by following the guided procedure to simplify the step of determining the number Q of first sub-markers $L_1$, whereby the convenience of the image projection method is improved.

According to the image projection method described in the other embodiments, the number Q of first sub-markers $L_1$ projected onto the screen SC is automatically incremented when the positions of the first sub-markers $L_1$ reach the boundary line indicating the widest range over which the first image $30_1$ can be projected. The step of determining the number Q of first sub-markers $L_1$ can thus be simplified, whereby the convenience of the image projection method is improved.

In addition to the above, the present disclosure, of course, encompasses a variety of embodiments that have not been described above, such as a configuration to which arbitrary configurations described the aforementioned embodiments are mutually applied. The technical scope of the present disclosure is specified only by the inventive specific items according to the claims reasonably derived from the above description.

What is claimed is:

1. An image projection method comprising:
    projecting a plurality of first markers onto a screen;
    projecting one or more first sub-markers each having an exterior appearance different from an exterior appearance of each of the plurality of first markers onto the screen;
    determining positions of the plurality of first markers on the screen;
    determining positions of the first sub-markers on the screen;
    determining a shape of a contour of a first image projected on the screen based on the positions of the plurality of first markers;
    determining a first line and a first edge of a blend area where the first image and a second image different from the first image are mixed with each other based on the positions of the plurality of first markers and the positions of the first sub-markers, the first line and the first edge forming the contour of the first image; and
    projecting the first image onto the screen.

2. The image projection method according to claim 1, wherein the determining positions of the plurality of first markers includes detecting input for adjusting the positions of the plurality of first markers, and the determining positions of the first sub-markers includes detecting input for adjusting the positions of the first sub-markers.

3. The image projection method according to claim 1, further comprising performing geometric correction on the first image based on the first line and the first edge.

4. The image projection method according to claim 1, wherein the projecting the one or more first sub-markers includes projecting the first sub-markers after the positions of the plurality of first markers are determined.

5. The image projection method according to claim 1, further comprising:
projecting a plurality of second markers onto the screen;
projecting one or more second sub-markers each having an exterior appearance different from an exterior appearance of each of the plurality of second markers onto the screen;
determining positions of the plurality of second markers on the screen;
determining positions of the second sub-markers on the screen;
determining a shape of a contour of the second image based on the positions of the plurality of second markers; and
determining a second line and a second edge of the blend area based on the positions of the plurality of second markers and the positions of the second sub-markers, the second line and the second edge forming the contour of the second image.

6. The image projection method according to claim 5, wherein the projecting the one or more first sub-markers includes projecting the first sub-markers after the positions of the plurality of first markers and the plurality of second markers are determined, and
the projecting the one or more second sub-markers includes projecting the second sub-markers after the positions of the plurality of first markers and the plurality of second markers are determined.

7. The image projection method according to claim 5, wherein the number of second sub-markers is equal to the number of first sub-markers.

8. The image projection method according to claim 1, further comprising:
projecting a plurality of first identifiers corresponding to the plurality of first markers onto the screen; and
projecting first sub-identifiers corresponding to the first sub-markers onto the screen.

9. The image projection method according to claim 8, wherein the first sub-identifiers have information corresponding to the first identifier of the first marker closest to the first sub-markers out of the plurality of first markers.

10. The image projection method according to claim 1, further comprising guiding a user to a procedure of incrementing the number of first sub-markers projected onto the screen when the positions of the first sub-markers reach a boundary line indicating a widest range over which the first image is configured to be projected.

11. The image projection method according to claim 1, further comprising automatically incrementing the number of first sub-markers projected onto the screen when the positions of the first sub-markers reach a boundary line indicating a widest range over which the first image is configured to be projected.

12. The image projection method according to claim 1, further comprising detecting input for determining the number of first sub-markers.

13. The image projection method according to claim 1, wherein one or more initial positions where the one or more first sub-markers are projected fall within an area facing the second image within a widest range over which the first image is configured to be projected.

14. A projector comprising:
a projection lens that projects a plurality of first markers onto a screen, projects one or more first sub-markers each having an exterior appearance different from an exterior appearance of each of the plurality of first markers onto the screen, and projects a first image onto the screen;
an input interface that detects input for determining positions of the plurality of first markers on the screen and input for determining positions of the first sub-markers on the screen; and
a processing circuit that determines a shape of a contour of the first image based on the positions of the plurality of first markers, determines a first line and a first edge of a blend area where the first image and a second image different from the first image are mixed with each other based on the positions of the plurality of first markers and the first sub-markers, the first line and the first edge forming part of the contour of the first image.

15. An image projection method comprising:
projecting a plurality of first markers onto a screen;
projecting a first interpolation marker having an exterior appearance different from an exterior appearance of each of the plurality of first markers onto the screen;
determining positions of the plurality of first markers and the first interpolation marker on the screen in such a way that the first interpolation marker is disposed in a position shifted from the plurality of first markers toward a second image projected on the screen in a first direction in which a first image projected on the screen and the second image projected on the screen and different from the first image are sequentially arranged;
determining a first line that passes through the plurality of first markers and the first interpolation marker and forms part of a contour of the first image;
determining a first edge of a blend area, where the first image and the second image are mixed with each other, connected to points located on the first line between the first interpolation marker and the first marker closest to the first interpolation marker out of the plurality of first markers, and the first edge forming part of the contour of the first image;
performing geometric correction on the first image based on the first line and the first edge; and
projecting the first image onto the screen.

16. The image projection method according to claim 15, wherein the determining positions of the plurality of first markers and the first interpolation marker includes detecting input for adjusting the positions of the plurality of first markers and the first interpolation marker.

17. The image projection method according to claim 15, wherein the first line is a curved line.

18. The image projection method according to claim 15, further comprising detecting input for setting an amount of blending that defines a dimension of the blend area in the first direction,
wherein the first edge is determined based on the amount of blending.

19. The image projection method according to claim 15, further comprising:
projecting a plurality of first identifiers corresponding to the plurality of first markers onto the screen, and projecting a first interpolation identifier corresponding to the first interpolation marker onto the screen.

20. The image projection method according to claim 19, wherein the first interpolation identifier has information corresponding to the first identifier of the first marker closest to the first interpolation marker.

\* \* \* \* \*